(12) United States Patent
Kolb et al.

(10) Patent No.: US 8,309,501 B2
(45) Date of Patent: Nov. 13, 2012

(54) ETHYLENE-BASED COPOLYMERS, LUBRICATING OIL COMPOSITIONS CONTAINING THE SAME, AND METHODS FOR MAKING THEM

(75) Inventors: Rainer Kolb, Kingwood, TX (US); Sudhin Datta, Houston, TX (US); Liehpao Oscar Farng, Lawrenceville, NJ (US); Vera Minak-Bernero, Bridgewater, NJ (US); Eric B. Sirota, Flemington, NJ (US); Thomas Tungshi Sun, Clinton, NJ (US); Mun Fu Tse, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 281 days.

(21) Appl. No.: 12/761,880

(22) Filed: Apr. 16, 2010

(65) Prior Publication Data
US 2010/0273692 A1 Oct. 28, 2010

Related U.S. Application Data

(60) Provisional application No. 61/173,528, filed on Apr. 28, 2009, provisional application No. 61/173,501, filed on Apr. 28, 2009, provisional application No. 61/299,816, filed on Jan. 29, 2010, provisional application No. 61/297,621, filed on Jan. 22, 2010.

(51) Int. Cl.
*C10L 1/16* (2006.01)
*C10L 1/22* (2006.01)
(52) U.S. Cl. .......................... 508/591; 508/241
(58) Field of Classification Search .................. 508/591, 508/241
See application file for complete search history.

(56) References Cited

U.S. PATENT DOCUMENTS

| | | |
|---|---|---|
| 1,969,324 A | 8/1934 | Poulter |
| 2,969,324 A | 1/1961 | Knapp et al. |
| 3,760,001 A | 9/1973 | Staendeke |
| 3,778,375 A | 12/1973 | Braid et al. |
| 3,779,928 A | 12/1973 | Schlicht |
| 3,852,205 A | 12/1974 | Kablaoui et al. |
| 3,879,306 A | 4/1975 | Kablaoui et al. |
| 3,932,290 A | 1/1976 | Koch et al. |
| 3,933,659 A | 1/1976 | Lyle et al. |
| 4,028,258 A | 6/1977 | Kablaoui et al. |
| 4,105,571 A | 8/1978 | Shaub et al. |
| 4,176,074 A | 11/1979 | Coupland et al. |
| 4,344,853 A | 8/1982 | Gutierrez et al. |
| 4,464,493 A | 8/1984 | Joffrion |
| 4,540,753 A | 9/1985 | Cozewith et al. |
| 4,542,199 A | 9/1985 | Kaminsky et al. |
| 4,752,597 A | 6/1988 | Turner |
| 4,792,595 A | 12/1988 | Cozewith et al. |
| 4,804,794 A | 2/1989 | Ver Strate et al. |
| 4,871,705 A | 10/1989 | Hoel |
| 4,892,851 A | 1/1990 | Ewen et al. |
| 4,959,436 A | 9/1990 | Cozewith et al. |
| 5,008,204 A | 4/1991 | Stehling |
| 5,017,714 A | 5/1991 | Welborn, Jr. |
| 5,026,798 A | 6/1991 | Canich |
| 5,055,438 A | 10/1991 | Canich |
| 5,068,047 A | 11/1991 | Chung et al. |
| 5,096,867 A | 3/1992 | Canich |
| 5,120,867 A | 6/1992 | Welborn, Jr. |
| 5,132,262 A | 7/1992 | Rieger et al. |
| 5,132,281 A | 7/1992 | Chevallier et al. |
| 5,151,080 A | 9/1992 | Bick |
| 5,151,204 A | 9/1992 | Struglinski |
| 5,153,157 A | 10/1992 | Hlatky et al. |
| 5,155,080 A | 10/1992 | Elder et al. |
| 5,198,401 A | 3/1993 | Turner et al. |
| 5,243,001 A | 9/1993 | Winter et al. |
| 5,264,405 A | 11/1993 | Canich |
| 5,278,119 A | 1/1994 | Turner et al. |
| 5,278,264 A | 1/1994 | Spaleck et al. |
| 5,296,434 A | 3/1994 | Karl et al. |
| 5,304,614 A | 4/1994 | Winter et al. |
| 5,318,935 A | 6/1994 | Canich et al. |
| 5,324,800 A | 6/1994 | Welborn, Jr. et al. |
| 5,382,630 A | 1/1995 | Stehling et al. |
| 5,387,568 A | 2/1995 | Ewen et al. |
| 5,391,617 A | 2/1995 | Olivier et al. |

(Continued)

FOREIGN PATENT DOCUMENTS

EP 0 277 003 8/1988

(Continued)

OTHER PUBLICATIONS

L. Wild et al., "*Determination of Branching Distributions in Polyethylene and Ethylene Copolymers*", J. Poly. Sci., Poly. Phys. Ed., 1982, vol. 20, pp. 441-455.
H. N. Cheng et al., "$^{13}C$ *NMR Analysis of Compositional Heterogeneity in Ethylene-Propylene Copolymers*", Macromolecules, 1991, vol. 24, Issue 8, pp. 1724-1726.
C. Cozewith, "*Interpretation of $^{13}C$ NMR Sequence Distribution for Ethylene-Propylene Copolymers Made with Heterogeneous Catalysts*", Macromolecules, 1987, vol. 20, Issue 6, pp. 1237-1244.
M. Kakugo et al., "$^{13}C$ *NMR Determination of Monomer Sequence Distribution in Ethylene-Propylene Copolymers Prepared with $\delta$-$TiCl_3$-$Al(C_2H_5)_2Cl$*", Macromolecules, 1982, vol. 15, Issue 4, pp. 1150-1152.
C. Cozewith et al., "*Ethylene-Propylene Copolymers. Reactivity Ratios, Evaluation, and Significance*", Macromolecules, 1971, vol. 4, Issue 4, pp. 482-489.

(Continued)

*Primary Examiner* — Walter D Griffin
*Assistant Examiner* — Francis C Campanell

(57) ABSTRACT

Provided are ethylene-based copolymers, methods of preparing the same, lubricating oil compositions including the same, methods for preparing such lubricating oil compositions, and end uses for such ethylene-based copolymers and lubricating oil compositions. The ethylene-based copolymers may include less than about 80 wt. % of units derived from ethylene and one or more alpha-olefin comonomers having 3 to 20 carbon atoms. The ethylene-based copolymers have a melting peak (Tm), as measured by DSC, of 80° C. or less, and a polydispersity index of about 2.8 or less. In some embodiments, the ethylene-based copolymers have an intramolecular composition distribution of about 50 wt. % or less and/or an intermolecular composition distribution of about 50 wt. % or less.

16 Claims, 3 Drawing Sheets

U.S. PATENT DOCUMENTS

| | | | |
|---|---|---|---|
| 5,391,629 | A | 2/1995 | Turner et al. |
| 5,446,221 | A | 8/1995 | Struglinski |
| 5,451,630 | A | 9/1995 | Olivier et al. |
| 5,451,636 | A | 9/1995 | Olivier et al. |
| 5,621,126 | A | 4/1997 | Canich et al. |
| 5,665,800 | A | 9/1997 | Lai et al. |
| 5,955,625 | A | 9/1999 | Canich |
| 5,969,070 | A | 10/1999 | Waymouth et al. |
| 6,034,187 | A | 3/2000 | Maehama et al. |
| 6,265,338 | B1 | 7/2001 | Canich |
| RE37,400 | E | 10/2001 | Canich |
| 6,319,998 | B1 | 11/2001 | Cozewith et al. |
| 6,376,409 | B1 | 4/2002 | Burkhardt et al. |
| 6,376,412 | B1 | 4/2002 | Burkhardt et al. |
| 6,380,120 | B1 | 4/2002 | Burkhardt et al. |
| RE37,788 | E | 7/2002 | Canich |
| 6,525,007 | B2 | 2/2003 | Okada et al. |
| 6,589,920 | B2 | 7/2003 | Okada et al. |
| 6,638,887 | B1 | 10/2003 | Canich |
| 6,881,800 | B2 | 4/2005 | Friedersdorf |
| 7,053,153 | B2 * | 5/2006 | Schauder ............... 525/191 |
| 7,163,907 | B1 | 1/2007 | Canich et al. |
| 7,232,871 | B2 | 6/2007 | Datta et al. |
| 7,402,235 | B2 | 7/2008 | Huang |
| 7,569,646 | B1 | 8/2009 | Canich |
| 2002/0055445 | A1 | 5/2002 | Okada et al. |
| 2003/0176579 | A1 | 9/2003 | Mishra et al. |
| 2004/0121922 | A1 | 6/2004 | Okada et al. |
| 2006/0142496 | A1 * | 6/2006 | Datta et al. ............... 525/240 |
| 2007/0167315 | A1 | 7/2007 | Arriola et al. |
| 2009/0209721 | A1 | 8/2009 | Ikeda et al. |
| 2010/0273693 | A1 | 10/2010 | Datta et al. |

FOREIGN PATENT DOCUMENTS

| | | |
|---|---|---|
| EP | 0 277 004 | 8/1988 |
| EP | 0 287 239 | 10/1988 |
| EP | 0 426 637 | 5/1991 |
| EP | 0 427 697 | 5/1991 |
| EP | 0 495 375 | 7/1992 |
| EP | 0 500 944 | 9/1992 |
| EP | 0 511 665 | 11/1992 |
| EP | 0 520 732 | 12/1992 |
| EP | 0 570 982 | 11/1993 |
| EP | 0 573 403 | 12/1993 |
| EP | 0 577 581 | 1/1994 |
| EP | 0 578 838 | 1/1994 |
| EP | 0 612 768 | 8/1994 |
| EP | 0 637 611 | 2/1995 |
| EP | 0 638 611 | 2/1995 |
| EP | 1 148 115 | 10/2001 |
| EP | 1 178 102 | 2/2002 |
| EP | 1 262 498 | 12/2002 |
| WO | WO 92/00333 | 1/1992 |
| WO | WO 93/10495 | 5/1993 |
| WO | WO 93/19103 | 9/1993 |
| WO | WO 99/07788 | 2/1999 |
| WO | WO 99/29743 | 6/1999 |
| WO | WO 99/45062 | 9/1999 |
| WO | WO 99/60033 | 11/1999 |
| WO | WO 01/48034 | 7/2001 |
| WO | WO 03/040201 | 5/2003 |
| WO | WO 2006/102146 | 9/2006 |
| WO | WO 2009/012153 | 1/2009 |
| WO | WO 2010/126721 | 11/2010 |

OTHER PUBLICATIONS

J. C. Randall, "*Methylene Sequence Distributions and Number Average Sequence Lengths in Ethylene-Propylene Copolymers*", Macromolecules, 1978, vol. 11, Issue 1, pp. 33-36.

H. N. Cheng, "$^{13}C$ *NMR Analysis of Ethylene-Propylene Rubbers*", Macromolecules, 1984, vol. 17, Issue 10, pp. 1950-1955.

G. J. Ray et al., "*Carbon-13 Nuclear Magnetic Resonance Determination of Monomer Composition and Sequence Distributions in Ethylene-propylene Copolymers Prepared with a Stereoregular Catalyst System*", Macromolecules, 1977, vol. 10 Issue 4, pp. 773-778.

T. Sun et al., "*A Study of the Separation Principle in Size Exclusion Chromatography*", Macromolecules, 2004, vol. 37, Issue 11, pp. 4304-4312.

T. Sun et al., "*Effect of Short Chain Branching on the Coil Dimensions of Polyolefins in Dilute Solution*", Macromolecules, 2001, vol. 34, Issue 19, pp. 6812-6820.

W. Spaleck et al., "*The Influence of Aromatic Substituents on the Polymerization Behavior of Bridged Zirconocene Catalysts*", Organometallics, 1994, vol. 13, pp. 954-963.

H. Brintzinger et al., "*ansa-Zirconocene Polymerization Catalysts with Annelated Ring Ligands-Effects on Catalytic Activity and Polymer Chain Length*", Organometallics, 1994, vol. 13, pp. 964-970.

A. C. Ouano, "*Gel Permeation Chromatography*", Polymer Molecular Weights Part II, ed. P. E. Slade, Marcel Dekker, Inc., NY 1975, pp. 287-368.

F. Rodriguez, "*The Molecular Weight of Polymers*", Principles of Polymer Systems $3^{rd}$ ed., Hemisphere Pub. Corp., NY, 1989, pp. 155-160.

G. Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.

U.S. Appl. No. 60/243,192, "*Processes and Apparatus for Continuous Solution Polymerization*", Oct. 25, 2000.

Wittig, H. et al., "Uber neue Triaryl-bor-Ver-bindungen und ihre Tetraarylo-borat-Komplexe (V. Mitteil.[1])," Chemische Berichte, 1955, vol. 88, pp. 962-976.

\* cited by examiner

ETHYLENE-BASED COPOLYMERS, LUBRICATING OIL COMPOSITIONS CONTAINING THE SAME, AND METHODS FOR MAKING THEM

US PRIORITY

This application claims the priority to and the benefit from U.S. Ser. No. 61/173,528, filed on Apr. 28, 2009, and U.S. Ser. No. 61/173,501, filed on Apr. 28, 2009, and U.S. Ser. No. 12/569,009, filed on Sep. 29, 2009, all of which are incorporated herein by reference in their entirety.

CROSS REFERENCE TO RELATED APPLICATIONS

This application is related to U.S. Ser. No. 61/299,816, filed Jan. 29, 2010, and U.S. Ser. No. 61/297,621, filed on Jan. 22, 2010, which are herein incorporated by reference in their entirety.

FIELD OF THE INVENTION

Provided are ethylene-based copolymers, methods of preparing the same, lubricating oil compositions including the same, methods for preparing such lubricating oil compositions, and end uses for such ethylene-based copolymers and lubricating oil compositions. More particularly, provided are ethylene-based copolymers and compositions containing the same, which are useful for increasing the thickening efficiency of lubricating oils and related compositions.

BACKGROUND OF THE INVENTION

Many natural and synthetic compositions may benefit from additives that modify rheology. For example, lubricant oil formulations generally contain viscosity index (VI) improvers derived from polyolefins that modify rheological behavior.

There have been many attempts to develop polyolefin additives that have a high thickening efficiency without raising the average ethylene content or the propensity to chain scission under shear.

However, conventional polyolefin additives suffer from unfavorable characteristics such as: (a) a high molecular weight fraction such that they are more affected by shear induced degradation of the molecular weight—such compositions have an unfavorable Thickening Efficiency (TE)/ Shear Stability Index ratio (SSI) ratio in that they have a lower TE for a given SSI; (b) preparation with metallocene catalysts in bulk polymerization process, which provides process reactor heterogeneity that leads to significant intermolecular composition and broadening of polydispersity index; (c) a blend of amorphous and semi crystalline polyolefins that have a significant and predetermined intermolecular compositional heterogeneity; and (d) polymerization conditions providing polymers having significant long chain branching, which provides a diminished TE because they are topologically constrained from being dispersed uniformly, at a molecular level, in solution.

Conventional VI improvers are taught in U.S. Pat. Nos. 4,540,753; 4,804,794; 4,871,705; 5,151,204; 5,391,617; 5,446,221; 5,665,800; 6,525,007; 6,589,920; and 7,053,153, which are each incorporated herein by reference in their entirety.

Some conventional VI improvers, such as those described in U.S. Pat. Nos. 4,540,753 and 4,804,794, use an ultra narrow Polydipersity Index (PDI) composition. It is anticipated that these ultra narrow PDI polymers lack a high molecular weight fraction so that they would be less affected by the shear induced degradation of the molecular weight. Such compositions are expected to have low SSI or a correspondingly high TE/SSI ratio.

Other conventional VI improvers, such as those described in U.S. Pat. Nos. 4,871,705 and 5,151,204, attempt to overcome structural limitations by using a metallocene catalyst which provides a polyolefin having a distribution of molecular weights. However the use of the metallocene catalysts in bulk polymerization process as described in the applications indicates that the process reactor heterogeneity would lead to significant intermolecular composition and broadening of the polydispersity index in the copolymer. Without being limited by theory, it is believed that the broader polydispersity index is due to differences in the mixing and transport and equilibration of the constituent monomers as well as differences in the temperature of the different positions inside the polymerization reactor.

Another conventional VI improver includes a blend of amorphous and semi crystalline polyolefins as described in U.S. Pat. Nos. 5,391,617 and 7,053,153. The combination of two such polymers attempts to provide increased TE, shear stability, low temperature viscosity performance, and pour point. However, the design of the molecules have a significant and predetermined intermolecular compositional heterogeneity.

Still another conventional VI improver is described in U.S. Pat. Nos. 6,525,007, 6,589,920, and 5,446,221. Such compositions are prepared with a single site metallocene catalyst in a solution polymerization. However the choice of the metallocene catalysts as well as the polymerization conditions indicate that these polymers should have significant long chain branching as shown in U.S. Pat. No. 5,665,800. Such long chain branched polymers have a diminished TE compared to their linear analogues since they are topologically constrained from being dispersed uniformly, at a molecular level, in solution.

There remains a need for VI improving compositions that promote the following in lubricant oils, while maintaining a low ethylene content: (a) a more constant viscosity over a broad range of temperatures; (b) improved TE; and (c) improved ratio of the TE to the SSI.

SUMMARY OF THE INVENTION

Provided are ethylene-based copolymers, methods of preparing the same, lubricating oil compositions including the same, methods for preparing such lubricating oil compositions, and end uses for such ethylene-based copolymers and lubricating oil compositions.

Ethylene-based copolymers include less than about 80 wt. % of units derived from ethylene and one or more alphaolefin comonomers having 3 to 20 carbon atoms. The ethylene-based copolymer has a melting peak (Tm), as measured by DSC, of 80° C. or less, a polydispersity index of about 2.8 or less. In some embodiments, the ethylene-based copolymers have an intermolecular composition distribution of about 50 wt. % or less. In other embodiments the ethylene-based copolymers have an intramolecular composition distribution of about 50 wt. % or less. In some embodiments, the ethylene-based copolymers have an intramolecular composition distribution of about 40 wt. % or less and/or an intermolecular composition distribution of about 40 wt. % or less.

The ethylene-based copolymers are useful in rheology modifying compositions, such as viscosity modifiers in oil and polymer compositions, e.g., lubricating oil compositions.

Lubricating oil compositions are composed of a lubricating oil base and the ethylene-based copolymer. When added to lubricant oils, ethylene-based copolymers promote a more constant viscosity over a broad range of temperatures, for example, operating conditions of combustion engines. Such improvements are achieved while maintaining a low ethylene content. At substantially similar composition and molecular weight, the present lubricating oil compositions exhibit unexpectedly improved physical properties, such as higher TE, and better ratio of the TE to the SSI compared to conventional viscosity modifiers.

Methods of preparing ethylene-based copolymers include utilizing a metallocene catalyst in a synthesis process designed to control the distribution of monomers and polymer chain architecture to form uniform and/or linear polymers. The resulting polymers exhibit high TE and a high ratio of TE/SSI. Further, the choice of the alpha olefin comonomer will affect other properties of the ethylene-based copolymer such as solubility parameter, TE, and SSI, but these secondary effects are overshadowed by the fundamental change and the control, due to the construction of the ethylene-based copolymer to be uniform and/or linear. Without being limited by theory, it is believed that the addition of alpha olefins may, in addition, lead to a further degree of control in the polymer chain such that the level of crystallinity will be diminished and thus the fluidity of the solutions containing the polymers will be enhanced.

DETAILED DESCRIPTION OF THE ILLUSTRATIVE EMBODIMENTS

Figure 1:
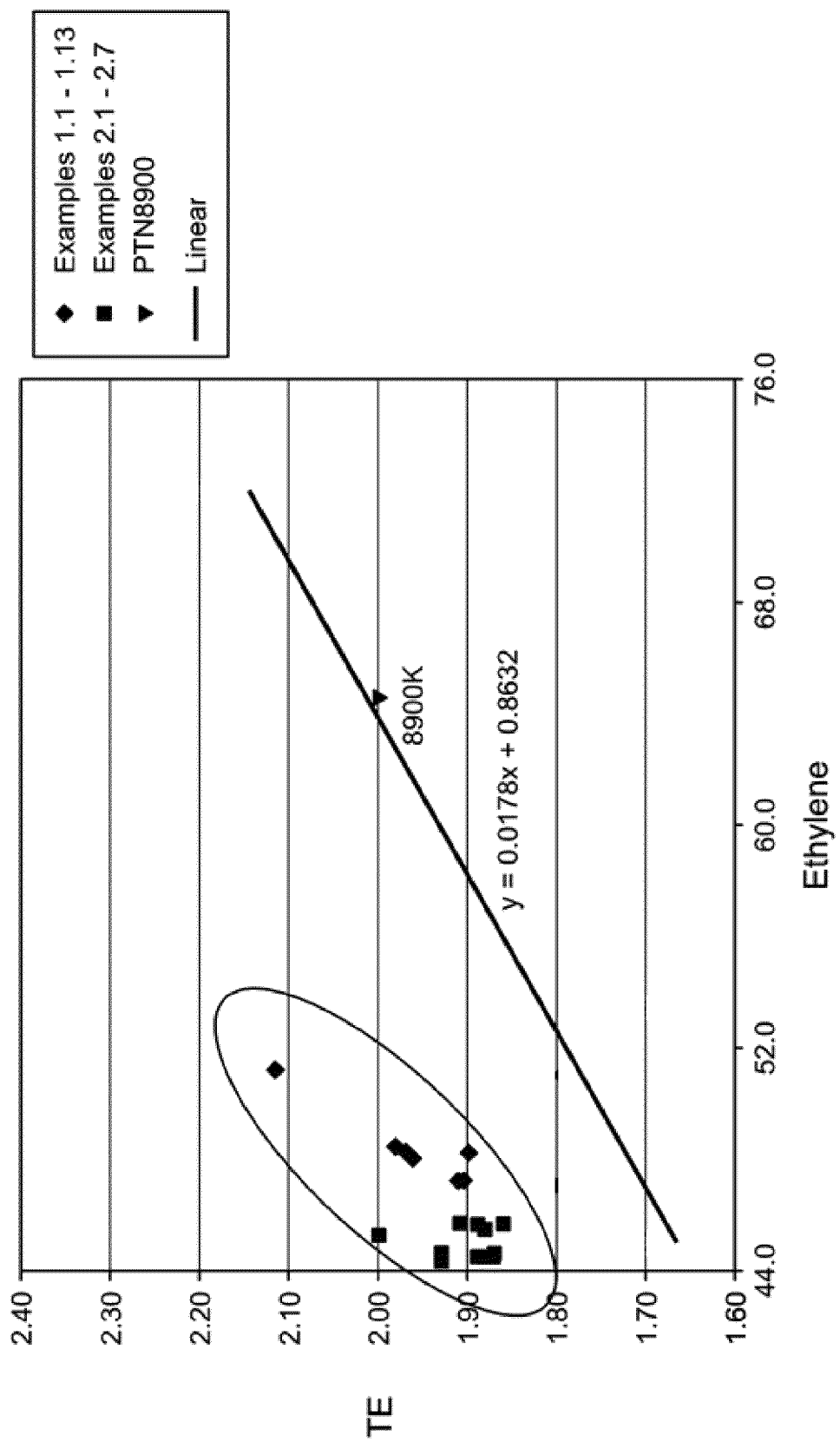
FIG. 1 is graph of TE versus ethylene weight percent for exemplary compositions and a conventional composition. This graph refers to experiments in "Group I Examples".
Figure 2:
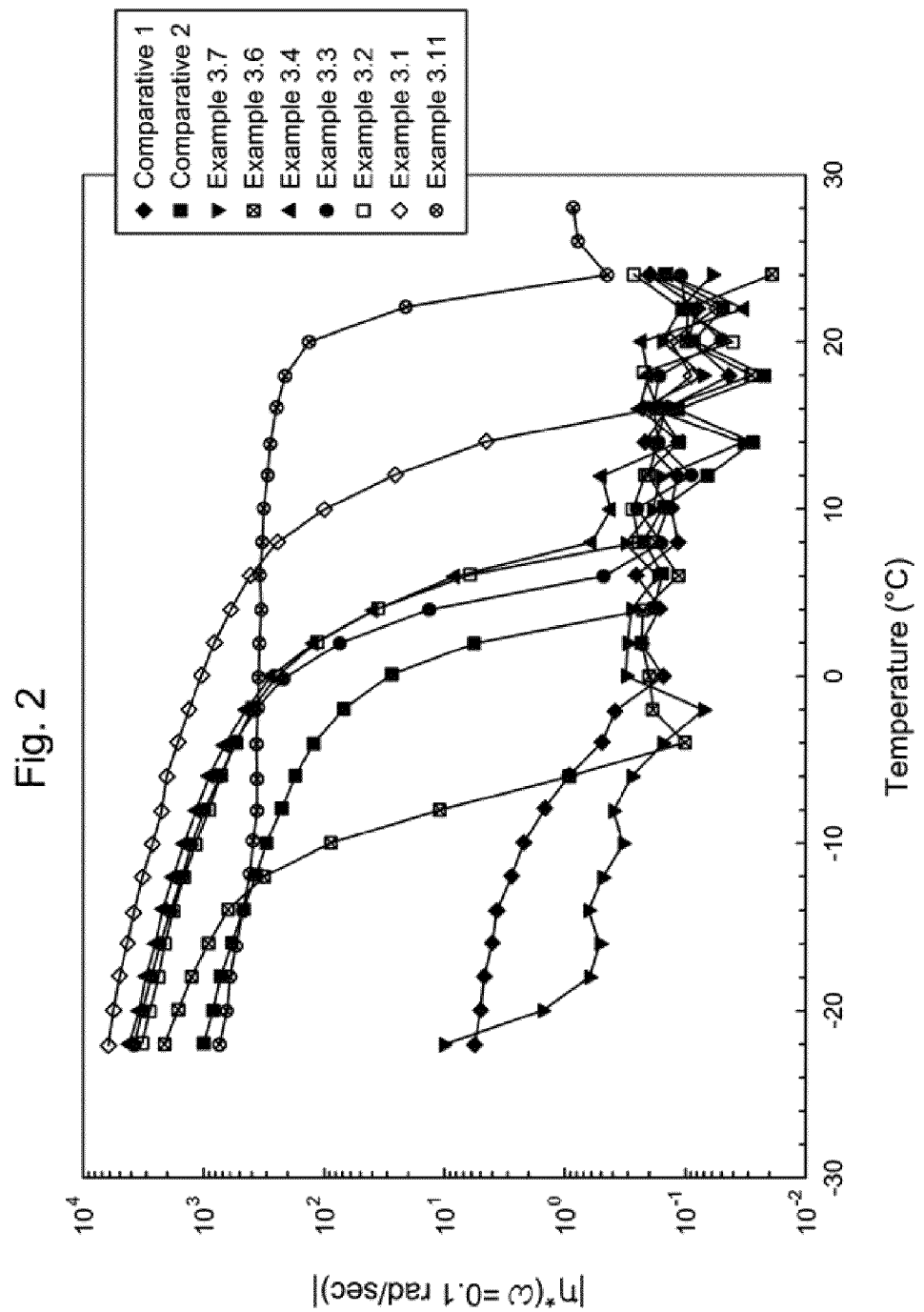
FIG. 2 is a graph of Anton Parr rheology data versus temperature showing the resistance to low temperature viscosity increase for exemplary compositions and conventional compositions. This graph refers to experiments in "Group I Examples".

Ethylene-based copolymers include less than about 80 wt. % of units derived from ethylene and alpha olefin comonomers having 3 to 20 carbon atoms. As used herein "ethylene-based copolymer" means a copolymer composed of a substantial quantity of ethylene monomer, e.g., greater than 30 wt. % ethylene, and one or more comonomers. Thus, ethylene-based copolymers may be composed of more units derived from alpha olefin comonomer by weight compared to units derived from ethylene. As used herein the term "copolymer" is any polymer having two or more monomers.

Suitable comonomers include propylene and α-olefins, such as $C_4$-$C_{20}$ α-olefins and preferably propylene and $C_4$-$C_{12}$ α-olefins. The α-olefin comonomer can be linear or branched, and two or more comonomers can be used, if desired. Thus, reference herein to "an alpha-olefin comonomer" includes one, two, or more alpha-olefin comonomers. Examples of suitable comonomers include propylene, linear $C_4$-$C_{12}$ α-olefins, and α-olefins having one or more $C_1$-$C_3$ alkyl branches. Specific examples include: propylene; 1-butene; 3-methyl-1-butene; 3,3-dimethyl-1-butene; 1-pentene; 1-pentene with one or more methyl, ethyl, or propyl substituents; 1-hexene with one or more methyl, ethyl, or propyl substituents; 1-heptene with one or more methyl, ethyl or propyl substituents; 1-octene with one or more methyl, ethyl, or propyl substituents; 1-nonene with one or more methyl, ethyl or propyl substituents; ethyl, methyl, or dimethyl-substituted 1-decene, or 1-dodecene. Preferred comonomers include: propylene; 1-butene; 1-pentene; 3-methyl-1-butene; 1-hexene; 3-methyl-1-pentene; 4-methyl-1-pentene; 3,3-dimethyl-1-butene; 1-heptene; 1-hexene with a methyl substituent on any of $C_3$-$C_5$; 1-pentene with two methyl substituents in any stoichiometrically acceptable combination on $C_3$ or $C_4$; 3-ethyl-1-pentene; 1-octene; 1-pentene with a methyl substituent on any of $C_3$ or $C_4$; 1-hexene with two methyl substituents in any stoichiometrically acceptable combination on $C_3$-$C_5$; 1-pentene with three methyl substituents in any stoichiometrically acceptable combination on $C_3$ or $C_4$; 1-hexene with an ethyl substituent on $C_3$ or $C_4$; 1-pentene with an ethyl substituent on $C_3$ and a methyl substituent in a stoichiometrically acceptable position on $C_3$ or $C_4$; 1-decene; 1-nonene; 1-nonene with a methyl substituent on any of $C_3$-$C_9$; 1-octene with two methyl substituents in any stoichiometrically acceptable combination on $C_3$-$C_7$; 1-heptene with three methyl substituents in any stoichiometrically acceptable combination on $C_3$-$C_6$; 1-octene with an ethyl substituent on any of $C_3$-$C_7$; 1-hexene with two ethyl substituents in any stoichiometrically acceptable combination on $C_3$ or $C_4$; and 1-dodecene.

Preferred alpha olefin comonomers are propylene, butene, hexene, or octene. A more preferred alpha olefin comonomer is propylene. Another preferred olefin comonomer is 1 butene. Combinations propylene and butene are contemplated.

Other suitable comonomers include internal olefins. Preferred internal olefins are cis 2-butene and trans 2-butene. Other internal olefins are contemplated.

Other suitable comonomers include polyenes. The term "polyene" as used herein is meant to include monomers having two or more unsaturations; i.e., dienes, trienes, etc. Polyenes particularly useful as co-monomers are non-conjugated dienes, preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene, 3,7-dimethyl-1,6; (c) single ring alicyclic dienes, such as 1,4-cyclohexadiene, 1,5-cyclo-octadiene, and 1,7-cyclododecadiene; (d) multi-ring alicyclic fused and bridged ring dienes, such as tetrahydroindene, norbornadiene, methyl-tetrahydroindene, dicyclopentadiene (DCPD), bicyclo-(2.2.1)-hepta-2,5-diene, alkenyl, alkylidene, cycloalkenyl, and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene (DCPD), 1,4-hexadiene, 1,6-octadiene, 5-methyl-1,4-hexadiene, 3,7-dimethyl-1,6-octadiene, 5-methylene-2-norbornene, 5-ethylidene-2-norbornene (ENB), and tetracyclo (Δ-11,12) 5,8 dodecene. Note that throughout this application the terms "polyene", "non-conjugated diene", and "diene" are used interchangeably. It is preferred to use dienes which do not lead to the formation of long chain branches. For successful use as VI improver non- or lowly branched polymer chains are preferred. Other polyenes that can be used include cyclopentadiene and octatetra-ene.

Ethylene-based copolymers include from about 30 wt. % to about 80 wt. % ethylene comonomer. Preferably, ethylene-based copolymers include less than about 70 wt. % ethylene comonomer, or less than about 60 wt. % ethylene comonomer. In some embodiments, ethylene-based copolymers include from about 40 wt. % to about 80 wt. % ethylene comonomer or from about 45 wt. % to about 70 wt. % ethylene comonomer. Ethylene-based copolymers include from about 42 wt. % to about 78 wt. % ethylene comonomer, or from about 45 wt. % to about 76 wt. % ethylene comonomer, or from about 48 wt. % to about 76 wt. % ethylene comonomer, or from about 48 wt. % to about 74 wt. % ethylene comonomer, or from about 50 wt. % to about 72 wt. % ethylene comonomer, or from about 45 wt. % to about 50 wt. % ethylene comonomer.

Ethylene-based copolymers exhibit one or more of the following properties or combinations of the following properties:

A weight-average molecular weight (Mw) in terms of polystyrene, as measured by GPC, in the range of about 30,000 to about 800,000. More preferably, the weight average Mw is from about 50,000 to about 600,000 or from about 80,000 to about 400,000. Even more preferably, the weight average Mw is from about 10,000 to about 300,000.

A number-average molecular weight (Mn), as measured by GPC, of from about 10,000 to about 400,000, or in the range of about 20,000 to about 300,000, or in the range of about 30,000 to about 200,000.

A weight-average molecular weight to number-average molecular weight (Mw/Mn) of about 5.0 or less, or about 4.0 or less, or 3.0 or less, or 2.2 or less. In one or more embodiments, the Mw/Mn is from about 1.0 to about 3.0, or from about 1.5 to about 2.5.

A PDI of less than about 2.8, or less than about 2.6, or less than about 2.4, preferably less than about 2.3 and more preferably less than about 2.2 as measured by GPC.

Substantially no crystallinity as evidenced by the absence of a melting peak as measured by DSC A melting point (Tm), if present, as measured by DSC, of about 110° C. or less, or about 100° C. or less, or about 90° C. or less, or about 80° C. or less, or about 70° C. or less, or about 65° C. or less.

A heat of fusion on a first melt of from about 0 to about 60 J/g, or from about 0 to about 50 J/g, or from about 0.001 to about 40 J/g, or from about 0.001 to about 35 J/g, or less than about 30 J/g, or less than about 20 J/g, or less than about 15 J/g, or about 10 J/g.

Intermolecular uniformity, such that the ethylene-based copolymers have an intermolecular composition distribution of about 50 wt. % or less, or 40 wt. % or less, or 30 wt. % or less, or 20 wt. % or less, or 15 wt. % or less, or 10 wt. % or less, or 5 wt. % or less. In some embodiments, at least 50 wt. %, at least 60 wt. %, at least 80 wt. %, at least 90 wt. %, or 100 wt. % of the ethylene-based copolymers have an intermolecular composition distribution of about 50 wt. % or less, or 40 wt. % or less, or 30 wt. % or less, or 20 wt. % or less, or 15 wt. % or less, or 10 wt. % or less, or 5 wt. % or less.

Intramolecular uniformity, such that the ethylene-based copolymers have an intramolecular composition distribution of about 50 wt. % or less, or 40 wt. % or less, or 30 wt. % or less, or 20 wt. % or less, or 15 wt. % or less, or 10 wt. % or less, or 5 wt. % or less. In some embodiments, at least 50 wt. %, at least 60 wt. %, at least 80 wt. %, at least 90 wt. %, or 100 wt. % of the ethylene-based copolymers have an intramolecular composition distribution of about 50 wt. % or less, or 40 wt. % or less, or 30 wt. % or less, or 20 wt. % or less, or 15 wt. % or less, or 10 wt. % or less, or 5 wt. % or less.

A substantially linear structure as having no greater than one branch point, pendant with a carbon chain larger than 19 carbon atoms, per 200 carbon atoms along the polymer backbone. In some embodiments, substantially linear ethylene-based copolymers are further characterized as having:

(a) less than 1 branch point, pendent with a carbon chain longer than 10 carbon atoms, per 200 carbon atoms along a polymer backbone, or less than 1 branch point per 300 carbon atoms, or less than 1 branch point per 500 carbon atoms and preferably less than 1 branch point per 1000 carbon atoms, notwithstanding the presence of branch points due to incorporation of the comonomer; and/or (b) no greater than one branch point, pendant with a carbon chain larger than 19 carbon atoms per 300 carbon atoms, or no greater than one per 500 carbon atoms, or no greater one per 1000 carbon atoms, or no greater than one per 2000 carbon atoms.

Ranges from any of the lower limits to any of the upper limits are contemplated by the inventors and are within the scope of the present description.

As used herein, intermolecular composition distribution (InterCD or intermolecular CD), i.e., a measure of compositional heterogeneity, defines the compositional variation, in terms of ethylene content, among polymer chains. It is expressed as the minimum deviation, analogous to a standard deviation, in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example, an intermolecular composition distribution of 15 wt. % shall mean the larger of the positive or negative deviations.

At 50 wt. % intermolecular composition distribution the measurement is similar to conventional Composition Distribution Breadth Index (CDBI). As used herein CDBI is defined in U.S. Pat. No. 5,382,630 which is hereby incorporated by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *Journal of Polymer Science: Polymer Physics Edition*, Vol. 20, Issue 3, pp. 441-455 (1982) and U.S. Pat. No. 5,008,204, which are incorporated herein by reference.

As used herein intramolecular composition distribution (IntraCD or intramolecular CD) is similar to intermolecular composition distribution; however, IntraCD measures the compositional variation, in terms of ethylene, within a copolymer chain. Intramolecular-CD is expressed as the ratio of alpha-olefin to ethylene along the segments of the same polymer chain. InterCD and IntraCD are described in U.S. Pat. No. 4,959,436, which is hereby incorporated by reference.

Compositional heterogeneity both intermolecular-CD and intramolecular-CD are determined by carbon-13 NMR. Conventional techniques for measuring intermolecular-CD and intramolecular-CD are described in H. N. Cheng et al., *Macromolecules*, entitled "Carbon-13 NMR analysis of compositional heterogeneity in ethylene-propylene copolymers", 24 (8), pp 1724-1726, (1991), and in the publication *Macromolecules*, C. Cozewith, entitled "Interpretation of carbon-13 NMR sequence distribution for ethylene-propylene copolymers made with heterogeneous catalysts", 20 (6), pp 1237-1244, (1987), each of which is herein incorporated by reference in its entirety.

Generally, conventional carbon-13 NMR measurement of diad and triad distribution is used to characterize the ethylene-based copolymer. Any conventional technique for measuring carbon-13 NMR may be utilized. For example, ethylene-based copolymer samples are dissolved in a solvent, e.g., trichlorobenzene at 4.5 wt. % concentration. The Carbon-13 NMR spectra are obtained at elevated temperature, e.g., 140° C., on a NMR spectrometer at 100 MHz. An exemplary spectrometer is a pulsed Fourier transform Varian XL-400 NMR spectrometer. Deuteriated o-dichlorobenzene is placed in a coaxial tube to maintain an internal lock signal. The following instrument conditions are utilized: pulse angle, 75°; pulse delay, 25 s; acquisition time, 0.5 s, sweep width, 16000 Hz. The carbob-13 NMR peak area measurements were determined by spectral integration. Diad and triad concentrations were calculated from the equations presented in Kakugo et al., *Macromolecules*, 15, pp. 1150-1152, (1982), which is herein incorporated by reference in its entirety. The diad and triad concentrations were then normalized to give a mole fraction distribution. Polymer composition was calculated form the methane peaks, the methylene peaks, and the diad balance. These values may be considered individually or an average of the three values may be utilized. Unless stated otherwise, this application utilizes an average of these three values. The results are then compared to conventional model equations as disclosed in the above references.

One aspect of these measurements involves the determination of the reactivity ratios ($r_1 r_2$) of the polymerization system for the ethylene-based polymers. Polymers which have a compositional heterogeneity, either intramolecular or intermolecular, have a much larger reactivity ratio than the polymers which have only a small or negligible amount.

Without being limited to theory or one method of calculation, it is believed that an one exemplary model for, so called ideal copolymerizations, is described by the terminal copolymerization model:

$$m = M(r_1 M+1)/(r_2 + M) \quad (1)$$

Wherein $r_1$ and $r_2$ are the reactivity ratios, m is the ratio of monomers in the copolymer, $m_1/m_2$, M is the ratio of monomers in the reactor, $M_1/M_2$, and the diad and triad concentrations follow first order Markov statistics. For this model, nine equations are derived that related to the diad and triad concentrations $P_{12}$ and $P_{21}$, the probability of propylene adding to an ethylene-ended chain, and the probability of propylene adding to a propylene-ended chain, respectively. Thus a fit of carbon-13 NMR data to these equations yields $P_{12}$ and $P_{21}$ as the model parameters from which $r_1$ and $r_2$ can be obtained from the relationships:

$$r_1 M = (1-P_{12})/P_{12}$$

$$r_2/M = (1-P_{21})/P_{21}$$

The corresponding equations for random copolymerizations with $r_1 r_2 = 1$ can also be used to simplify equation (1), above, to $m = r_1 M$. The ethylene fraction in the polymer, E, is equal to $1-P_{12}$. This allows the diad and triad equations to be written in terms of polymer composition:

$$EE = E^2$$

$$EE = 2E(1-E)$$

$$PP = (1-E)^2$$

$$EEE = E^3$$

$$EEP = 2E^2(1-E)$$

$$EPE = E^2(1-E)$$

$$PEP = E(1-E)^2$$

$$PPE = 2E(1-E)^2$$

$$PPP = (1-E)^3$$

Variations and extensions of these equations are provided in the references incorporated above, including use of catalysts with different active sites, equations for estimating the number of catalyst species present, or complex models such as those with three or more species present, etc.

From these modeling equations, and those equations presented by C. Cozewith et al., *Macromolecules*, 4, pp. 482-489, (1971), which is herein incorporated by reference in its entirety, the average values of $r_1$, $r_2$, and $r_1 r_2$ arising from the copolymerization kinetics are given by:

$$\overline{r_1} = (\Sigma r_{1i} f_i / G_i)/(\Sigma f_i / G_i)$$

$$\overline{r_2} = (\Sigma r_{2i} f_i / G_i)/(\Sigma f_i / G_i)$$

$$\overline{r_1 r_2} = (\Sigma r_{1i} f_i / G_i)(\Sigma r_{2i} f_i / G_i)/(\Sigma f_i / G_i)^2$$

where $G_i = r_{1i} M \pm 2 + r_{2i}/M$

These equations and the models presented in the references cited above may be utilized by those skilled in the art to characterize the ethylene-based copolymer composition distribution.

Techniques for measuring intramolecular-CD are found in Randel, James C., *Macromolecules*, 11(1), pp. 33-36, (1978); Cheng, H. N., *Macromolecules*, 17(10), pp. 1950-1955, (1984); Ray, G. Joseph et al., *Macromolecules*, 10(4), pp. 773-778, (1977); and U.S. Pat. No. 7,232,871, each of which is incorporated by reference in its entirety. Such techniques are readily known to those skilled in the art of analyzing and characterizing olefin polymers.

As used herein, Polydispersity Index (PDI), also known as molecular weight distribution (MWD), is a measure of the range of molecular weights within a given copolymer sample. It is characterized in terms of at least one of the ratios of weight average to number average molecular weight, Mw/Mn.

Ethylene-based copolymers are useful as rheology modifying compositions. Accordingly, ethylene-based polymer compositions are used independently to modify rheology in hydrocarbon compositions, such as lubricating oils. Alternatively, ethylene-based copolymers are combined with conventional additives to modify the rheology of hydrocarbon compositions. As described below, conventional additives, include olefin-based additives, or mineral based additives, each of which is know to those skilled in the art.

Higher concentrations of additives may be utilized to form masterbatches of ethylene-based copolymers. Such masterbatches may include minor amounts of ethylene-based copolymers, such as from about 1.0 wt. % to about 10 wt. % or more than 10 wt. % of ethylene-based copolymer. Exemplary masterbatches also include larger quantities of ethylene-based copolymer such as from about 50 wt. % to about 99 wt. % ethylene-based copolymers.

Ethylene-based copolymers include a single reactor-grade polymer, an interpolymer, i.e., a reactor blend of one or more copolymers, or a post-reactor blend of one or more copolymer, i.e., either via blending pellets or otherwise.

In one or more embodiments, the ethylene-based copolymers are grafted, contain a grafted ethylene-based copolymer, or are part of a composition that is grafted. Typical grafting techniques are known to those skilled in the art, such techniques using maleic acid. In one or more embodiments, the ethylene-based copolymers are derivatized.

In one embodiment, the ethylene-based copolymer is composed of from about 35 wt. % to about 80 wt. % of units derived from ethylene, based on the weight of the ethylene-based copolymer, and an α-olefin comonomer having 3 to 20 carbon atoms, wherein the ethylene-based copolymer has: (a) a melting point (Tm), as measured by DSC, of 80° C. or less, a melting peak (Tm), as measured by DSC, of 80° C. or less; (b) a polydispersity index of about 2.6 or less; and (c) an intramolecular composition distribution of about 30 wt. % or less.

In one embodiment, the ethylene-based copolymer is composed of from about 40 wt. % to about 60 wt. % of units derived from ethylene, based on the weight of the ethylene-based copolymer, and at least 1.0 wt. % α-olefin comonomer having 3 to 20 carbon atoms, wherein the ethylene-based copolymer has: (a) a melting point (Tm), as measured by DSC, of 80° C. or less, a melting peak (Tm), as measured by DSC, of 80° C. or less; (b) a polydispersity index of about 2.4 or less; and (c) an intramolecular composition distribution of about 20 wt. % or less.

In one embodiment, the ethylene-based copolymer is composed of from about 40 wt. % to about 60 wt. % of units derived from ethylene, based on the weight of the ethylene-based copolymer, and at least 1.0 wt. % α-olefin comonomer having 3 to 20 carbon atoms, wherein the ethylene-based copolymer has: (a) a melting point (Tm), as measured by DSC, of 80° C. or less, a melting peak (Tm), as measured by DSC, of 80° C. or less; (b) a polydispersity index of about 2.4 or less; (c) an intramolecular composition distribution of about 15 wt. % or less; and (d) an intermolecular composition distribution of about 15 wt. % or less.

In each of the intermolecular and intramolecular composition distribution values disclosed herein, at least 50 wt. %, preferably at least 60 wt. %, at least 80 wt. %, at least 90 wt. %, and most preferably 100 wt. % of the ethylene-based copolymers have the distribution values recited.

In one or more embodiments, two or more ethylene-based copolymers are combined to form compositionally disperse polymeric compositions. Compositionally disperse polymeric compositions are taught in U.S. Provisional Patent App. No. 61/173,501, incorporated herein by reference in its entirety. Accordingly, the ethylene-based copolymer is blended with other components, e.g., additional ethylene-based polymers and/or additives, to form compositionally disperse polymeric compositions.

In one or more embodiments, two or more ethylene-based copolymers are combined to form crystallinity dispersed polymeric compositions. Crystallinity dispersed polymeric compositions are taught in U.S. Provisional Patent App. No. 61/173,501. Accordingly, the ethylene-based copolymer is blended with other components, e.g., additional ethylene-based polymers and/or additives, to form compositionally disperse polymeric compositions.

In one or more embodiments, the ethylene-based copolymer is substantially, or completely amorphous. Substantially amorphous as used herein means less than about 2.0 wt. % crystallinity. Preferably, amorphous ethylene-based copolymers have less than about 1.5 wt. % crystallinity, or less than about 1.0 wt. % crystallinity, or less than about 0.5 wt. % crystallinity, or less than 0.1 wt. % crystallinity. In a preferred embodiment, the amorphous ethylene-based copolymer does not exhibit a melt peak as measured by DSC.

Exemplary amorphous ethylene-based copolymers are composed of from about 35 wt. % to about 60 wt. % units derived from ethylene, and at least 1.0 wt. % or more of an α-olefin comonomer having 3 to 20 carbon atoms, based on the weight of the ethylene-based copolymer, wherein the ethylene-based copolymer is substantially amorphous, and has a polydispersity index of about 2.6 or less, or about 2.4 or less, or about 2.2 or less.

In other embodiments of such "amorphous" ethylene-based copolymers, the ethylene-based copolymer is composed of from about 35 wt. % to about 50 wt. % unit derived from ethylene, or from about 40 wt. % to about 50 wt. % unit derived from ethylene, or from about 45 wt. % to about 50 wt. % unit derived from ethylene, or from about 45 wt. % to about 49 wt. % unit derived from ethylene, based on the weight of the ethylene-based copolymer.

Preferably, such amorphous ethylene-based copolymers exhibit no substantial melting peak or no melting peak when measured by DSC.

In one or more embodiments, the amorphous ethylene-based copolymer have an MFR (230° C., 2.16 kg) of from about 3 to about 10 kg/10 min.

In one or more embodiments, the amorphous ethylene-based copolymer has an intramolecular composition distribution of about 15 wt. % or less, or an intermolecular composition distribution of about 15 wt. % or less, or both an intra-CD and inter-CD of 15 wt. % or less.

Ethylene-based copolymers, as described herein, are useful as blend components in conventional polymer compositions, e.g., ethylene homopolymers or copolymers, or propylene homopolymers or copolymers, and in thermoplastic vulcanizates (TPV). Further, such ethylene-based copolymers are useful as additives or primary components in molded articles, extrudates, films, e.g., blown films, etc., woven and nonwoven fabrics, adhesives, and conventional elastomer applications.

Methods For Preparing Ethylene-Based Copolymers

Methods for making ethylene-based copolymers include a step for copolymerizing an ethylene and an alpha-olefin. Preferably, methods of preparing ethylene-based polymers include the steps of copolymerizing ethylene and a first comonomer in the presence of a first metallocene catalyst in a first polymerization reaction zone under first polymerization conditions to produce a first effluent comprising a first ethylene-based copolymer.

Methods of preparing ethylene-based copolymers include the steps of copolymerizing ethylene and one or more comonomer in the presence of one or more metallocene catalysts in one or more polymerization reaction zones under polymerization conditions to produce one or more effluents, respectively, which each comprise an ethylene-based copolymer. Thus, such methods contemplate the use of two or more reactors to prepare a single ethylene-based copolymer, or two or more reactors that are used to prepare two or more ethylene-based copolymers that are blended during or after polymerization.

Conventional processes have prepared VI improving polymers by bulk polymerizations or multi-step processes. Such complicated or uneconomical processes may be used to prepare the present ethylene-based copolymers. However, it is preferred to use simplified process as described herein.

Catalyst System

The term "catalyst system" means a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety. The transition metal compound or complex may be neutral as in a precatalyst, or a charged species with a counter ion as in an activated catalyst system. The term "catalyst-system" can also include more than one catalyst precursor and or more than one activator and optionally a co-activator. Likewise, the term "catalyst-system" can also include more than one activated catalyst and one or more activator or other charge-balancing moiety, and optionally a co-activator.

Catalyst precursor is also often referred to as precatalyst, catalyst, catalyst compound, transition metal compound, or transition metal complex. These terms are used interchangeably. Activator and cocatalyst (or co-catalyst) are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments, a co-activator can be pre-mixed with the transition metal compound to form an alkylated transition metal compound.

An activator or cocatalyst is a compound or mixture of compounds capable of activating a precatalyst to form an activated catalyst. The activator can be a neutral compound (Lewis acid activator) such as tris-perfluorophenyl boron or tris-perfluorophenyl aluminium, or an ionic compound (ionic activator) such as dimethylanilinium tetrakis-perfluorophenyl borate or dimethylanilinium tetrakis-perfluoronaphthyl borate. Activators are also commonly referred to as non-coordinating anion activators or ionic activators owing to the commonly held belief by those skilled in the art, that the reaction of the activator with the precatalyst forms a cationic metal complex and an anionic non-coordinating or weakly coordinating anion.

Catalyst

Although any conventional catalyst may be used to prepare ethylene-based copolymers, preferably polymerization takes place in the presence of a metallocene catalyst. The term "metallocene", "metallocene precatalysts" and "metallocene catalyst precursor", as used herein, shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof. The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursor is preferably one of, or a mixture of metallocene compounds of either or both of the following types: (1) Cp complexes which have two Cp ring systems for ligands (also referred to as a bis-Cp or bis-Cp complex); and (2) Monocyclopentadienyl complexes which have only one Cp ring system as a ligand (also referred to as a mono-Cp or mono-Cp complex).

Cp complexes of the first type, i.e., group 1, have two Cp ring systems for ligands that form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula:

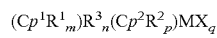

wherein $Cp^1$ of ligand $(Cp^1R^1_m)$ and $Cp^2$ of ligand $(Cp^2R^2_p)$ are the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R_1$ and/or $R_2$ substituents on adjacent carbon atoms of the cyclopentadienyl ring associated there with can be joined together to form a ring containing from 4 to about 20 carbon atoms; $R^3$ is a bridging group, n is the number of atoms in the direct chain between the two ligands and is an integer from 0 to 8, preferably 0 to 3 (where 0 indicates the absence of the bridging group); M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydride, or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

The Cp ligand in monocyclopentadienyl complexes which have only one Cp ring system, i.e., group 2, forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA, or a coordination number of two, from group VIA of the periodic table of the elements. These mono-cyclopentadienyl complexes have the general formula:

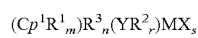

wherein $R^1$ is, each independently, a halogen or a hydrocarbyl, halocarbyl, hydrocarbyl-substituted organometalloid or halocarbyl-substituted organometalloid group containing up to about 20 carbon atoms, "m" is 0 to 5, and two $R_1$ substituents on adjacent carbon atoms of the cyclopentadienyl ring associated there with can be joined together to form a ring containing from 4 to about 20 carbon atoms; $R^3$ is a bridging group, "n" is an integer from 0 to 3 (where 0 indicates the absence of the bridging group), M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group VA or a coordination number of two from group VIA preferably nitrogen, phosphorous, oxygen, or sulfur, r is 1 when Y has a coordination number of three and n is not 0 or when Y has a coordination number of two and n is 0, r is 2 when Y has a coordination number of three and n is 0, or r is 0 (meaning $R^2$ is absent) when Y has a coordination number of two and n is not 0, $R^2$ is a radical selected from a group consisting of $C_1$ to $C_{20}$ hydrocarbyl radicals, substituted $C_1$ to $C_{20}$ hydrocarbyl radicals, wherein one or more hydrogen atoms is replaced with a halogen atom; and each X is a non-cyclopentadienyl ligand and is, independently, a halogen, a hydride, or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2. In a preferred embodiment, the catalyst utilized is a di(p-triethylsilylphenyl)methenyl[(cyclopentadienyl)(2,7-di-tert-butylfluoren-9-yl)]hafnium dimethyl.

Examples of suitable biscyclopentadienyl metallocenes of the type described in group 1 above are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614; each of which is incorporated by reference herein in its entirety.

In one or more embodiments, copolymerization techniques utilize more than one catalyst, i.e., two or more bis-Cp catalysts, or two or more mono-Cp catalysts, or one or more bis-Cp catalysts, with one or more mono-Cp catalysts.

Activators

The catalyst precursors employed in the present process can also be activated with cocatalysts or activators that comprise non-coordinating anions or they can be activated with Lewis acid activators, or a combination thereof.

Ionic activators comprise non-coordinating anions. The term "non-coordinating anion" (NCA) means an anion which either does not coordinate to said transition metal cation or which is only weakly coordinated to said cation, thereby remaining sufficiently labile to be displaced by a neutral Lewis base. "Compatible" NCAs are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful for the purposes herein are those which are compatible, stabilize the metallocene cation in the sense of balancing its ionic charge in a +1 state, and yet retain sufficient lability to permit displacement by an ethylenically or acetylenically unsaturated monomer during polymerization. Additionally, the anions useful for the purposes herein will be large or bulky in the sense of sufficient molecular size to largely inhibit or prevent neutralization of the metallocene cation by Lewis bases other than the polymerizable monomers that may be present in the polymerization process. Typically, the anion will have a molecular size of greater than or equal to about 4 angstroms. NCAs are preferred because of their ability to produce a target molecular weight polymer at a higher temperature than tends to be the case with other activation systems such as alumoxane.

Descriptions of ionic catalysts for coordination polymerization using metallocene cations activated by NCAs appear in EP-A-0 277 003; EP-A-0 277 004; WO92/00333; and U.S. Pat. Nos. 5,198,401, and 5,278,119, each of which are herein incorporated by reference in their entirety. These references teach a preferred method of preparation wherein metallocenes (bis-Cp and mono-Cp) are protonated by an anionic precursors such that an alkyl/hydride group is abstracted from a transition metal to make it both cationic and charge-balanced by the NCA. The use of ionizing ionic compounds not containing an active proton but capable of producing both the active metallocene cation and a NCA are also known. See, e.g., EP-A-0 426 637, EP-A-0 573 403, and U.S. Pat. No. 5,387,568, each of which are herein incorporated by reference in their entirety. Reactive cations other than Bronsted acids capable of ionizing the metallocene compounds include ferrocenium triphenylcarbonium and triethylsilylinium cations.

Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum, and the like. Suitable metalloids include, but are not limited to, boron, phosphorus, silicon, and the like. The description of NCAs and precursors thereto of these documents are incorporated herein by reference in their entirety.

An additional method of making the ionic catalysts uses ionizing anionic pre-cursors (Lewis acid activators) which are initially neutral Lewis acids but form the cation and anion upon ionizing reaction with the metallocene compounds, for example tris(pentafluorophenyl) boron acts to abstract an alkyl, hydride, or silyl ligand to yield a metallocene cation and stabilizing NCA, see, e.g., EP-A-0 427 697 and EP-A-0 520 732, each of which are herein incorporated by reference in their entirety. Ionic catalysts for addition polymerization can also be prepared by oxidation of the metal centers of transition metal compounds by anionic precursors containing metallic oxidizing groups along with the anion groups, see EP-A-0 495 375, which is herein incorporated by reference in its entirety.

Where the metal ligands include halide moieties, for example, (methyl-phenyl) silylene (tetramethylcyclopentadienyl)(tert-buty-amido) zirconium dichloride), which are not capable of ionizing abstraction under standard conditions, they can be converted via known alkylation reactions with organometallic compounds such as lithium, or aluminum hydrides, or alkyls, alkylalumoxanes, Grignard reagents, etc. Processes describing the reaction of alkyl aluminum compounds with dihalide substituted metallocene compounds prior to or with the addition of activating anionic compounds are found in EP-A-0 500 944, EP-A1-0 570 982, and EP-A1-0 612 768, each of which are herein incorporated by reference in their entirety. For example, an aluminum alkyl compound may be mixed with the metallocene prior to its introduction into the reaction vessel. Since the alkyl aluminum is also suitable as a scavenger, its use in excess of that normally stoichiometrically required for alkylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator. Alumoxanes may also fulfill a scavenging function.

Similarly, a co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators are typically used in combination with Lewis acid activators and Ionic activators when the pre-catalyst is not a dihydrocarbyl or dihydride complex.

Known alkylalumoxanes are additionally suitable as catalyst activators, particularly for those metallocenes comprising halide ligands. The alumoxane component useful as catalyst activator typically is an oligomeric aluminum compound represented by the general formula $(R-Al-O)_n$, which is a cyclic compound, or $R(R-Al-O)_1AlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Polymerization Process

The ethylene-based copolymer is preferably polymerized in a single well stirred tank reactor in solution where the viscosity of the solution during polymerization is less than 10000 cps, or less than 7000 cps, and preferably less than 500 cps.

The reactor is preferably liquid filled, continuous flow, stirred tank reactors providing full back mixing for random copolymer production. Solvent, monomers, and catalyst are fed to the reactor. When two or more reactors are utilized, solvent, monomers, and/or catalyst is fed to the first reactor or to one or more additional reactors.

Reactors may be cooled by reactor jackets or cooling coils, autorefrigeration, prechilled feeds, or combinations of all three to absorb the heat of the exothermic polymerization reaction. Autorefrigerated reactor cooling requires the presence of a vapor phase in the reactor. Adiabatic reactors with prechilled feeds are preferred, in which the polymerization exotherm is absorbed by permitting a temperature rise of the polymerizing liquid.

Use of hydrogen to control molecular weight may be avoided or reduced, if desired. The reactor temperature may be used to control the molecular weight of the polymer fraction produced. In series operation, this gives rise to a temperature difference between reactors which is helpful for controlling polymer molecular weight. In one or more embodiments, this technique is used to prepare bimodal copolymers.

Reactor temperature is selected, depending upon the effect of temperature on catalyst deactivation rate, and polymer properties, and/or extent of monomer depletion. For best monomer conversion, it is desirable to operate at as high a temperature as possible using relatively concentrated polymer solutions.

When using more than one reactor, generally temperatures should not exceed the point at which the concentration of catalyst in the second reactor is insufficient to make the desired polymer component in the desired amount.

Therefore, reaction temperature is determined by the details of the catalyst system. In general, a single reactor or first reactor in a series will operate at a reactor temperature from about 0° C. to about 120° C., or from about 0° C. to about 110° C., or from about 40° C. to about 100° C. Preferably, reaction temperatures are from about 10° C. to about 90° C., or more preferably from about 20° C. to about 70° C., or from about 80° C. to about 120° C. When using on or more additional reactors, the additional reactor temperature will vary from 40-160° C., with 50-140° C. preferred, and 60-120° C. more preferred. Ranges from any of the recited lower limits to any of the recited upper limits are contemplated by the inventors and within the scope of the present description.

In copolymerization techniques that utilize both a one or more bis-Cp catalysts with one or more mono-Cp catalysts, a lower reaction temperature is preferred for reactions utilizing mono-Cp catalyst when compared to the bis-Cp catalyst.

Reaction pressure is determined by the details of the catalyst system. In general reactors, whether a single reactor or each of a series of reactors, operates at a reactor pressure of less than 600 pounds per square inch (psi) (4.134 Mpa), or less than 500 psi (3.445 Mpa), or less than 400 psi (2.756 Mpa), or less than 300 psi (2.067 Mpa). Preferably, reactor pressure is from about atmospheric pressure to about 400 psi (2.756 Mpa), or from about 200 psi (1.378 Mpa) to about 350 psi (2.411 Mpa), or from about 300 psi (2.067 Mpa) to about 375 psi (2.584 Mpa). Ranges from any of the recited lower limits to any of the recited upper limits are contemplated by the inventors and within the scope of the present description.

In the case of less stable catalysts, catalyst can also be fed to a second reactor when the selected process uses reactors in series. Optimal temperatures can be achieved, particularly for series operation with progressively increasing polymerization temperature, by using bis-Cp catalyst systems containing hafnium as the transition metal, especially those having a covalent, single atom bridge coupling the two cyclopentadienyl rings.

Particular reactor configurations and processes suitable for use in the processes described herein are described in detail in U.S. patent application Ser. Nos. 09/260,787, filed Mar. 1, 1999, and 60/243,192, filed Oct. 25, 2000, the disclosures of which are incorporated herein by reference in their entireties.

Preferably, the linearity of the ethylene-based copolymers is preserved during polymerization. Branching is introduced by the choice of polymerization catalysts, process condition as the choice of the transfer agent. High polymerization temperatures lead to branched polymers as does the use of thermally induced transfer.

The copolymerization process may occur with or without hydrogen present. However, hydrogen is a preferred chain transfer agent because it inhibits branching in the copolymers since it lead to chain ends which are completely or substantially saturated. Without being limited by theory, it is believed that these saturated polymers cannot participate in the principal branching pathway where preformed polymers with unsaturated chain ends are reincorporated into new growing chains which lead to branched polymers. Lower polymerization temperatures also lead to lower branching since the formation of chains with unsaturated ends is inhibited by lower scission processes.

Lubricating Oil Compositions

Lubricating oil composition are composed of at least one ethylene-based polymer and at least one lubrication oil base. Thus, ethylene-based polymers are used as viscosity modifiers for lubrication fluids. In some embodiments, lubricating oil compositions are composed of: (a) two or more ethylene-based copolymers and a lubricating oil base; (b) an ethylene-based copolymer and two or more lubricating oil bases; or (c) two or more ethylene-based copolymers and two or more lubricating oil bases. In one or more embodiments, the lubricating oil compositions include one or more conventional additives that are known to those skilled in the art. A preferred additive is a pour point depressant.

As used herein Viscosity Index (VI) is the ability of a lubricating oil to accommodate increases in temperature with a minimum decrease in viscosity. The greater this ability, the higher the VI.

Relative performance of VI improving compositions may be measured by TE and/or ratio of TE/SSI. TE and SSI reflect the efficacy of the increase in viscosity and the persistence of the increased viscosity under conditions of high shear, respectively. TE is measured in a dilute or semidilute solution in base oil according to ASTM D445. Shear stability index is measured in a dilute or semidilute solution in base oil according to ASTM D6278. In this usage, relative performance increases, or is considered more desirable, as TE increases and SSI values decrease.

In the industry the generally accepted procedure is to use the appropriate amount of the olefin copolymer viscosity improver to raise the viscosity of the basestock oil by a predetermined amount. At higher TE effectively less of the rheology modifier is needed to have a similar increase in the viscosity of the base stock oil. This diminished use leads to a substantially simpler formulation where other additives such as pour point depressants can be decreased or eliminated compared to equivalent formulation made with conventional viscosity modifiers.

It is generally believed that the composition of the olefin copolymer and the average molecular weight largely determine the TE which is favored by increases in either area. Thus, higher ethylene content rheology modifiers are preferred because of their higher TE. While increasing ethylene content leads to improved TE/SSI ratios, the compositional change also leads to increasing crystallinity of the olefin copolymer. Crystallinities are apparent as measured by DSC at compositions near or above 45 wt. % ethylene for ethylene propylene copolymers. This detracts from the performance as a VI improver since these crystalline polymers tend to flocculate, either by themselves or in association with other components of the lubricating oil and precipitate out of the lubricating oils. These precipitates are apparent as regions ('lumps') of high viscosity or essentially complete solidification (gels) and can lead to clogs and blockages of pumps and other passageways for the lubrication fluid and can lead to harm and in some cases failure of moving machinery.

An alternate mode of raising the TE of a rheology modifying compositions is to raise the molecular weight. This method is effective, but also leads to higher, and therefore detrimental, SSI characteristics. Thus, a higher molecular weight polymer, while effective in raising the viscosity of the basestock oil, also leads to a temporary effect since the increase in viscosity rapidly disappears in a region of high shear as the molecular weight of the polymer rapidly degrades. It is easy to understand that in a polymer sample containing a distribution of molecular weights the most rapid degradation of molecular weights in a high shear region would be for the molecules with the highest molecular weights, since these molecules with the longest backbone length would be most susceptible to a random chain scission mechanism.

While not being bound by any particular theory, it is believed that lubrication fluids composed of the present ethylene-based copolymer, have near the most probable distribution of molecular weight, i.e., having a PDI less than about 2.4, preferably less than about 2.3, and more preferably less than about 2.2 as measured by GPC, and are both intra and inter molecularly uniform. Such lubricating oil compositions will have a higher TE and be less prone to the deleterious effects of macroscopic crystallization in dilute solution as measured by the change in the rheology of the fluid solution compared to an equivalent amount of an ethylene copolymer which does not have these structural limitations. This effect will be most noted in solution at subambient, ambient, and supra ambient temperatures.

It is also believed that these ethylene-based copolymer will have lower crystallinization on cooling from ambient to subambient temperatures, resulting in better low temperature flow properties in solution, as compared to equivalent compositionally uniform polymers of similar molecular weight and TE. Dilute solutions of ethylene-based copolymers display a higher TE and lower SSI compared to similar conventional compositions. The present ethylene-based copolymers have a superior low temperature performance as measured by reduced viscosity of the solutions at low temperature.

Generally, the TE of a polyolefin copolymer is a function of the composition. For ethylene-based copolymers, in particular those containing propylene comonomers, TE increases with ethylene content of the polymer. FIG. 1 illustrates the effect of ethylene content where the TE of various ethylene-propylene copolymers of different compositions is plotted.

The ethylene-based copolymers described herein have an unusually high TE with respect to the known and conventional viscosity improving compositions for similar SSI. While not wishing to be bound by speculation, it is believed that this unexpected and beneficial attribute of the polymer arises from a predetermined control of molecular structure which comprises all or some of the following parts:

1. The ethylene-based copolymer molecule is rigorously narrow in composition both intramolecularly, and intermolecularly.
2. The ethylene-based copolymer is the "most probable" molecular weight distribution without substantial molecular weight digression, in either the high or the low molecular weight end of the distribution.
3. The ethylene-based copolymer molecule is linear with little or negligible evidence of long chain branching, as determined by rheological and molecular weight measurements.

As shown in FIG. 1, such ethylene-based copolymers have a TE that is reproducibly higher than that of other competitive polymers with similar ethylene concentration. When combinations of characteristics 1-3 are present, or all are present, the resultant ethylene-based copolymers are highly effective and yet do not have low temperature viscometrics problems characteristic of high TE viscosity modifiers. For example, the TE of an ethylene-based polymer with a 48 wt. % ethylene content is comparable to existing polymers, such as Paratone 8900K, which has an ethylene content 64 wt. %.

In some embodiments of lubricant oil compositions, the ethylene-based copolymer has an ethylene content of less than about 80 wt. %, or more preferably less than 78 wt. %, and even more preferably less than 76 wt. %, and even more preferably less than 74 wt. %. It is also desirable that the ethylene content of the ethylene-based copolymer be greater than 25 wt. % ethylene, or greater than 30 wt. % ethylene, or greater than 35 wt. % ethylene, and greater than 40 wt. % ethylene.

In some embodiments of lubricant oil compositions, the ethylene-based copolymer has a molecular weight measured as the number average molecular weight by GPC of more than about 20,000, or more than about 25,000, or preferably more than about 30,000. The molecular weight measured as the number average molecular weight by GPC is less than about 200,000, or less than about 180,000, or less than about 150,000, and preferably less than about 120,000.

In some embodiments of lubricant oil compositions, the ethylene-based copolymer has a molecular weight distribution as close to "most probable" distribution, but less than 2.4 PDI, or less than 2.3 PDI, or less than 2.2 PDI.

In some embodiments of lubricant oil compositions, the ethylene-based copolymer is compositionally homogeneous both intermolecularly and intramolecularly with less than about 15 wt. %, or preferably less than about 10 wt. %, and preferably less than about 5 wt. % of the polymer segments having a composition greater than 1 standard deviation away from the mean composition.

In some embodiments of lubricant oil compositions, the ethylene-based copolymer is linear with less than 1 branch point along 200 carbon atoms along a backbone, or less than 1 per 300 branchpoints, or less than 1 per 500 carbon atoms, and preferably less than 1 per 1000 carbon atoms notwithstanding the presence of branch points due to incorporation of the comonomer.

Lubricating Oil Base

As used herein, lubricating oil bases include each conventional lubricating oil bases known to those skilled in the art. Examples of the lubricating oil bases include mineral oils and synthetic oils such as poly-α-olefins, polyol esters, and polyalkylene glycols. A mineral oil or a blend of a mineral oil and a synthetic oil is preferably employed. The mineral oil is generally used after subjected to purification such as dewaxing. Although mineral oils are divided into several classes according to the purification method, generally used is a mineral oil having a wax content of about 0.5 to about 10 wt. %. Further, a mineral oil having a kinematic viscosity of 10 to 200 cSt is generally used.

Suitable base oils include those conventionally employed as crankcase lubricating oils for spark-ignited and compression-ignited internal combustion engines, such as automobile and truck engines, marine and railroad diesel engines, and the like. Advantageous results are also achieved by employing the ethylene-based copolymers in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation of the present ethylene-based copolymers.

Suitable base oils include not only hydrocarbon oils derived from petroleum, but also include synthetic lubricating oils such as esters of dibasic acids, complex esters made by esterification of monobasic acids, polyglycols, dibasic acids and alcohols, polyolefin oils, etc. Thus, ethylene-based copolymers are suitably incorporated into synthetic base oils such as alkyl esters of dicarboxylic acids, polyglycols and alcohols, polyalpha-olefins, polybutenes, alkyl benzenes, organic esters of phosphoric acids, polysilicone oils.

The above oil compositions may optionally contain other conventional additives, such as, for example, pour point depressants, antiwear agents, antioxidants, other viscosity-index improvers, dispersants, corrosion inhibitors, antifoaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are taught in U.S. Pat. No. 1,969,324, the disclosure of which is incorporated herein by reference.

Oxidation inhibitors, or antioxidants, reduce the tendency of mineral oils to deteriorate in service, as evidenced by the products of oxidation such as sludge and varnish-like deposits on the metal surfaces, and by viscosity growth. Such oxidation inhibitors include alkaline earth metal salts of alkylphenolthioesters having $C_5$ to $C_{12}$ alkyl side chains, e.g., calcium nonylphenate sulfide, barium octylphenate sulfide, dioctylphenylamine, phenylalphanaphthylamine, phosphosulfurized or sulfurized hydrocarbons, etc.

Other oxidation inhibitors or antioxidants useful in this invention include oil-soluble copper compounds, such as described in U.S. Pat. No. 5,068,047, the disclosure of which is incorporated herein by reference.

Friction modifiers serve to impart the proper friction characteristics to lubricating oil compositions such as automatic transmission fluids. Representative examples of suitable friction modifiers are found in: U.S. Pat. No. 3,933,659, which discloses fatty acid esters and amides; U.S. Pat. No. 4,176,074, which describes molybdenum complexes of polyisobutenyl succinic anhydride-amino alkanols; U.S. Pat. No. 4,105,571, which discloses glycerol esters of dimerized fatty acids; U.S. Pat. No. 3,779,928, which discloses alkane phosphonic acid salts; U.S. Pat. No. 3,778,375, which discloses reaction products of a phosphonate with an oleamide; U.S. Pat. No. 3,852,205, which discloses S-carboxyalkylene hydrocarbyl succinimide, S-carboxyalkylene hydrocarbyl succinamic acid and mixtures thereof; U.S. Pat. No. 3,879,306, which discloses N(hydroxyalkyl)alkenyl-succinamic acids or succinimides; U.S. Pat. No. 3,932,290, which discloses reaction products of di-(lower alkyl) phosphites and epoxides; and U.S. Pat. No. 4,028,258 which discloses the alkylene oxide adduct of phosphosulfurized N-(hydroxyalkyl)alkenyl succinimides. Preferred friction modifiers are succinate esters, or metal salts thereof, of hydrocarbyl substituted succinic acids, or anhydrides and thiobis-alkanols, such as described in U.S. Pat. No. 4,344,853. The disclosures of the patents identified in this paragraph are each incorporated by reference herein in their entirety.

Dispersants maintain oil insolubles, resulting from oxidation during use, in suspension in the fluid, thus preventing sludge flocculation and precipitation or deposition on metal parts. Suitable dispersants include high molecular weight N-substituted alkenyl succinimides, the reaction product of oil-soluble polyisobutylene succinic anhydride with ethylene amines such as tetraethylene pentamine and borated salts thereof. High molecular weight esters (resulting from the esterification of olefin substituted succinic acids with mono or polyhydric aliphatic alcohols) or Mannich bases from high molecular weight alkylated phenols (resulting from the condensation of a high molecular weight alkylsubstituted phenol, an alkylene polyamine and an aldehyde such as formaldehyde) are also useful as dispersants.

Pour point depressants, otherwise known as lube oil flow improvers, lower the temperature at which the fluid will flow or can be poured. Such additives are well known in the art. Typically of those additives which usefully optimize the low temperature fluidity of the fluid are $C_8$ to $C_{18}$ dialkylfumarate vinyl acetate copolymers, polymethacrylates, and wax naphthalene.

Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiophate, which also serves as an antioxidant.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents.

Lubricating oil compositions include an effective amount of ethylene-based copolymer to improve or modify the VI of the base oil, i.e., a viscosity improving effective amount. Generally, this amount is from about 0.001 to about 20 wt. %, based on the weight of the lubricating oil composition, for a finished product (e.g., a fully formulated lubricating oil composition), with alternative lower limits of 0.01 wt. %, 0.1 wt. %, or 1 wt. %, and alternative upper limits of about 15 wt. % or about 10 wt. %, in other embodiments.

Preferably, the ethylene-based copolymer, or grafted and/or derivatized version thereof, has a solubility in oil of at least about 10 wt. %. In one or more embodiments, from about 0.001 to 49 wt. % of this composition is incorporated into a base oil, such as a lubricating oil or a hydrocarbon fuel, depending upon whether the desired product is a finished product or an additive concentrate. Ranges from any of the recited lower limits to any of the recited upper limits are within the scope of the present description.

In one or more embodiments, where lubricating oil compositions are composed of additives, additives are typically blended into the base oil in amounts which are effective to provide their normal attendant function. Thus, typical formulations can include, in amounts by weight, one or more ethylene-based copolymers (0.01-12%); a corrosion inhibitor (0.01-5%); an oxidation inhibitor (0.01-5%); depressant (0.01-5%); an anti-foaming agent (0.001-3%); an anti-wear agent (0.001-5%); a friction modifier (0.01-5%); a detergent/rust inhibitor (0.01-10%); and an oil base.

When other additives are used, it may be desirable, although not necessary, to prepare additive concentrates comprising concentrated solutions or dispersions of the ethylene-based copolymers together with one or more of the other additives, such a concentrate denoted an "additive package," whereby several additives can be added simultaneously to the base oil to form a lubricating oil composition.

Dissolution of the additive concentrate into the lubricating oil may be facilitated by solvents and by mixing accompanied with mild heating, but this is not essential. The additive-package will typically be formulated to contain an ethylene-based copolymer and optional additional additives in proper amounts to provide the desired concentration in the final formulation when the additive-package is combined with a predetermined amount of base lubricant. Thus, rheology modifying compositions can be added to small amounts of base oil or other compatible solvents along with other desirable additives to form additive-packages containing active ingredients in collective amounts of typically from about 2.5 to about 90 wt. %, preferably from about 5 to about 75 wt. %, and still more preferably from about 8 to about 50 wt. % by weight additives in the appropriate proportions with the remainder being base oil. In one or more embodiments, the final lubricating oil composition may use about 10 wt. % of the additive-package with the remainder being base oil.

In one or more embodiments, the rheology modifying compositions are utilized in a concentrate form, such as from 1 wt. % to 49 wt. % in oil, e.g., mineral lubricating oil, for ease of handling, and may be prepared in this form by carrying out the reaction of the invention in oil as previously described.

Methods of Preparing Lubricating Oil Compositions

Rheology modifying compositions are blended with base oils to form lubricant oil compositions. Conventional blending methods are described in U.S. Pat. No. 4,464,493, the disclosure of which is incorporated herein by reference. This conventional process requires passing the polymer through an extruder at elevated temperature for degradation of the polymer and circulating hot oil across the die face of the extruder while reducing the degraded polymer to particle size upon issuance from the extruder and into the hot oil. The pelletized, solid rheology modifying compositions are added by blending directly with the base oil, so that the conventional complex multi-step processes of the prior art are not needed. The solid polymer composition can be dissolved in the base oil without the need for additional shearing and degradation processes.

In embodiments where a viscosity modifying concentrate is prepared, the ethylene-based copolymer will be soluble at room temperature in lube oils at up to 10 percent concentration. Such concentrate, including eventually an additional additive package including the typical additives used in lube oil application as described above, is generally further diluted to the final concentration, typically about 1 wt. %, by multi-grade lube oil producers. In this case, the concentrate will be a pourable homogeneous solid free solution.

In one or more embodiments, ethylene-based copolymers have a SSI less than about 100, or less than about 80, or less than about 60, or less than about 50, or less than about 40. Preferably, ethylene-based copolymers have a SSI of from about 1 to about 60, or from about 10 to about 60, or from about 20 to about 60 or from about 10 to about 50. Ranges from any of the recited lower limits to any of the recited upper limits are within the scope of the present description.

Polymer Analysis

Unless stated otherwise, the following analysis techniques were utilized to characterize the various compositions and components described herein. Unless stated otherwise, the following analysis techniques apply to all characterization properties described above.

Ethylene wt. % was determined according to ASTM D1903.

DSC Measurements

The crystallization temperature Tc and melting temperature Tm of polymers, e.g., ethylene-based copolymers, were measured using a TA Instruments Model 2910 DSC. Typically, 6-10 mg of a polymer was sealed in a pan with a hermetic lid and loaded into the instrument. In a nitrogen environment, the sample was first cooled to $-100°$ C. at $20°$ C./min. It was heated to $220°$ C. at $10°$ C./min and melting data (first heat) were acquired. This provides information on the melting behavior under as-received conditions, which can be influenced by thermal history as well as sample preparation method. The sample was then equilibrated at $220°$ C. to erase its thermal history. Crystallization data (first cool) were acquired by cooling the sample from the melt to $-100°$ C. at $10°$ C./min and equilibrated at $-100°$ C. Finally, it was heated again to $220°$ C. at $10°$ C./min to acquire additional melting data (second heat). The endothermic melting transition (first and second heat) and exothermic crystallization transition (first cool) were analyzed for peak temperature and area under the peak. The term "melting point," as used herein, is the highest peak among principal and secondary melting peaks as determined by DSC during the second melt, discussed above. The thermal output is recorded as the area under the melting peak of the sample, which is typically at a maximum peak at about $30°$ C. to about $175°$ C., and occurs between the temperatures of about $0°$ C. and about $200°$ C. The thermal output is measured in Joules as a measure of the heat of fusion. The melting point is recorded as the temperature of the greatest heat absorption within the range of melting of the sample.

Size-Exclusion Chromatography of Polymers (SEC-3D)

Molecular weight (weight-average molecular weight, $M_w$, number-average molecular weight, $M_n$, and molecular weight distribution, $M_w/M_n$ or MWD) were determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors were calibrated, are described in T. Sun et al., *Macromolecules*, 34 (19), pp. 6812-6820, (2001).

Three Polymer Laboratories PLgel 10 mm Mixed-B columns were used. The nominal flow rate was 0.5 cm$^3$/min, and the nominal injection volume was 300 µL. The various transfer lines, columns and differential refractometer (the DRI detector) were contained in an oven maintained at 145° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 145° C. The injection concentration ranged from 1.0 to 2.0 mg/ml, with lower concentrations being used for higher molecular weight samples. Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm$^3$, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention and the claims thereto, $A_2$=0.0006 for propylene polymers and 0.001 otherwise], P(θ) is the form factor for a monodisperse random coil (M. B. Huglin, LIGHT SCATTERING FROM POLYMER SOLUTIONS, Academic Press, 1971), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 145° C. and λ=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g' = \frac{[\eta]_{avg}}{k M_v^\alpha}$$

where, for purpose of this invention and claims thereto, α=0.695 for ethylene, propylene, and butene polymers; and k=0.000579 for ethylene polymers, k=0.000228 for propylene polymers, and k=0.000181 for butene polymers. $M_v$ is the viscosity-average molecular weight based on molecular weights determined by LS analysis.

Temperature Rising Elution Fractionation (TREF)

The determination of intermolecular compositional heterogeneity was determined by the fractionation of the ethylene-based copolymer was carried out by a Polymer Char TREF 200 based on a well-known principle: the solubility of a semi-crystalline copolymer is a strong function of temperature. The heart of the instrument is a column packed with solid stainless-steel beads. The copolymer of interest was dissolved in 1,2 ortho-dichlorobenzene (oDCB) at 160° C. for 60 min. Half of a milliliter (ml) of the polymer solution (concentration=4-5 mg/ml) was injected in the column and it was stabilized there at 140° C. for 45 min. The solution was cooled from 140° C. to −15° C. at 1° C./min and equilibrated at this temperature for 10 min. This caused the copolymer to crystallize out of the quiescent solution in successive layers of decreasing crystallinity onto the surface of the beads. Pure solvent (oDCB) was pumped for 5 min at −15° C. at a flow rate of 1 ml/min through an infrared detector. A valve was then switched to allow this chilled oDCB to flow through the column at the same flow rate at −15° C. for 10 min. The material eluted was designated as the soluble fraction of the copolymer. At this point, the heater was on and the solvent continued to flow through both the column and the infrared detector while the temperature was programmed upward at a controlled rate of 2° C./min to 140° C. The infrared detector continuously measured the concentration of the copolymer in the effluent from the column, and a continuous solubility distribution curve was obtained.

Procedure for Gelation Visual Test

Place 10 ml sample of the solution into 40 ml glass vial with screw cap. A typical vial is available from VWR Corporation as catalog number (VWR cat #: C236-0040). Then heat the sample in an 80° C. oven for 1 hour to remove any thermal history. Store the vial at 10° C. for 4-6 hr in a Low Temperature Incubator. A typical incubator is available from VWR corporation as catalog number 35960-057. Then store the vial at −15° C.+/−0.5° C. overnight in a chest freezer. A typical chest freezer is Revco Model UTL 750-3-A30. A thermocouple is placed into a reference vial, identical to the sample but containing only the solvent or base oil to monitor the actual sample temperature. After 16 hours remove the vial from the freezer, do not remove the cap and immediately tilt the vial 80-90 degrees to an almost horizontal position. If condensation forms on the outside of the vial quickly wipe the vial with a paper towel. Use the following visual grading to rate the sample visually.

TABLE 1

| GRADE | DESCRIPTION | DETAILED COMMENTS |
|---|---|---|
| 0 | No gel | Free flowing fluid with mirror surface |
| 1 | Light gel | Slight non-homogeneity, surface roughness |
| 2 | Medium gel | Large non-homogeneity, slight pulling away from vial |
| 3 | Heavy gel | Pulls away from vial, large visible lumps |
| 4 | Solid | Solid gel |

Anton-Parr Low Temperature Solution Rheology (low temperature rheology) experiments were done on an Anton-Parr Model MCR501 rheometer using a 1" cone and plate setup. The cone has a nominal 1 degree angle and 50 micron gap. About 100 microliters of sample is deposited on the bottom plate using a syringe-pipette. The cone is then lowered onto the plate so that the volume between the cone and plate is fully occupied by solution. The temperature is then lowered at a cooling rate of 1.5° C./min. while measuring the complex viscosity at an angular frequency of 0.1 radians/sec., applying a 10% strain and recording a value every minute. The viscosity at 0.1 rad/sec is then plotted as a function of temperature to observe the effect of gelation. "Complex viscosity" as used herein means a frequency-dependent viscosity function determined during forced small amplitude harmonic oscillation of shear stress, in units of Pascal-seconds, that is equal to the difference between the dynamic viscosity and the out-of-phase viscosity (imaginary part of complex viscosity).

As used herein, any data generated using a Scanning Brookfield Viscometer Operation was gathered using procedures provided in ASTM D5133. Pour 25 to 30 ml of the sample into glass stator to the fill line which was immersed into an oil bath which is programmed to cool from −5° C. to −40° C. at 1° C./hour scanning speed. Pre-heat the sample to 90° C. for 90 minutes to remove thermal history. The temperature ramping program is set to cool from −5° C. to −40° C. at 1° C./hour scanning speed. In sample collection mode, the Gelation Index (GI) and maximum viscosity can be viewed. The torque versus temperature data set can be converted to a viscosity-temperature plot at which a gelation point and/or corresponding gelation index can be established.

Melt Flow Rate of the polymers was measured according to ASTM D1238 at 230° C., with a 2.16 kg load.

Kinematic viscosity was measured at 100° C. according to ASTM D445.

Thickening Efficiency (TE) was determined according to ASTM D445.

High temperature high shear (HTHS) viscosity was measured at 150° C. according to ASTM D5481.

Cold cranking simulator (CCS) tests were performed at −20° C. according to ASTM D5293.

Mini rotary viscometer (MRV) tests were performed at −30° C. according to ASTM D4684.

Pour point was determined according to ASTM D97.

Shear stability index (SSI) was determined according to ASTM D6278 at 30 and 90 passes using a Kurt Ohban machine.

Shear stress data was determined by first heating the sample to −15° C., and waiting for 15 minutes. Then while measuring the shear stress, applying a logarithmically increasing strain by varying the shear rate logarithmically from $10^{-3}$ to 10 with 20 points/decade and 1 seconds per point.

The number of branch points was determined by measuring the radius of gyration of polymers as a function of the molecular weight by the methods of size exclusion chromatography augmented by laser light scattering. These procedures are described in the publications "A Study of the Separation Principle in Size Exclusion Chromatography" by T Sun et al., *Macromolecules*, 2004, 37 (11), pp 4304-4312 and "Effect of Short Chain Branching on the Coil Dimensions of Polyolefins in Dilute Solution" by T Sun et al., *Macromolecules*, 2001, 34 (19), pp 6812-6820, which are both incorporated by reference.

Branching in ethylene-based copolymers can also be described by the ratio of the TE to the MFR@230° C. measured at a load of 2.16 Kg. High values of this parameter indicate low levels of branching while low levels indicate substantial levels of branching.

Further embodiments of ethylene-based copolymers and uses thereof are provided in the following embodiments:

A. An ethylene-based copolymer comprising:
  from about 35 wt. % to about 80 wt. % units derived from ethylene, and
  at least 1.0 wt. % or more of an α-olefin comonomer having 3 to 20 carbon atoms, based on the weight of the ethylene-based copolymer,
  wherein the ethylene-based copolymer has:
    a melting peak (Tm), as measured by DSC, of 80° C. or less;
    a polydispersity index of about 2.8 or less; and
    has an intramolecular composition distribution of about 15 wt. % or less.

B. The ethylene-based copolymer of embodiment A, wherein the ethylene-based copolymer composition comprises from about 35 wt. % to about 60 wt. % units derived from ethylene, based on the weight of the ethylene-based copolymer.

C. The ethylene-based copolymer of embodiment A or B, wherein the ethylene-based copolymer is substantially linear.

D. The ethylene-based copolymer of any of embodiments A-C, wherein the α-olefin comonomer is derived from propylene, butene, hexene, or octene.

E. The ethylene-based copolymer of any of embodiments A-D, wherein the ethylene-based copolymer is an ethylene/propylene copolymer.

F. The ethylene-based copolymer of any of embodiments A-E, wherein the ethylene-based copolymer is a metallocene catalyzed copolymer.

G. The ethylene-based copolymer of any of embodiments A-F, wherein the ethylene-based copolymer has a weight-average molecular weight (Mw) of from about 80,000 to about 400,000.

H. The ethylene-based copolymer of any of embodiments A-G, wherein the ethylene-based copolymer has an intermolecular composition distribution of about 15 wt. % or less.

I. The ethylene-based copolymer of any of embodiments A-H, wherein the ethylene-based copolymer has an intramolecular composition distribution of about 15 wt. % or less.

J. A masterbatch composition comprising the ethylene-based copolymer of any of embodiments A-I.

K. The masterbatch composition of embodiment J, further comprising at least one additive.

L. Method for modifying the rheology of a first composition comprising the step of combining the ethylene-based copolymer of any of embodiments A-I with the first composition.

M. A lubricating oil composition comprising:
(a) a lubricating oil base; and
(b) an ethylene-based copolymer comprising:
from about 35 wt. % to about 80 wt. % units derived from ethylene, and
at least 1.0 wt. % of an α-olefin comonomer having 3 to 20 carbon atoms, based on the weight of the ethylene-based copolymer,
wherein the ethylene-based copolymer has:
a melting point (Tm), as measured by DSC, of 80° C. or less;
a polydispersity index of about 2.8 or less; and
an intramolecular composition distribution of about 15 wt. % or less.

N. The lubricating oil composition of embodiment M, wherein the lubricating oil composition has a TE of about 2.2 or less.

O. The lubricating oil composition of embodiment M or N, wherein the lubricating oil composition has a TE of about 2.2 or less and the ethylene-based copolymer comprises from about 35 wt. % to about 60 wt. % units derived from ethylene, based on the weight of the ethylene-based copolymer.

P. The lubricating oil composition of any of embodiments M-O, wherein the lubricating oil composition exhibits no substantial crystallinity at about 0° C. or below.

Q. The lubricating oil composition of any of embodiments M-P, wherein the lubricating oil composition is characterized as having a slope less than one at less than 0° C. when viscosity at 0.1 rad/sec is plotted as a function of temperature.

R. The lubricating oil composition of any of embodiments M-Q, wherein the lubricating oil composition exhibits a SSI value of about 25 or less.

S. The lubricating oil composition of any of embodiments M-R, wherein the ethylene-based copolymer is substantially linear.

T. The lubricating oil composition of any of embodiments M-S, wherein the ethylene-based copolymer has a weight-average molecular weight (Mw) from about 80,000 to about 400,000.

U. The lubricating oil composition of any of embodiments M-T, wherein the lubricating oil composition comprises from about 0.1 wt. % to about 5 wt. % of ethylene-based copolymer.

V. The lubricating oil composition of any of embodiments M-U, further comprising at least one additive.

W. The lubricating oil composition of any of embodiments M-V, further comprising from about 0.05 wt. % to about 5 wt. % pour point depressant, based on the weight of the lubricating oil composition.

X. The lubricating oil composition of any of embodiments M-W, wherein the lubricating oil composition is a crankcase lubricating oil, automatic transmission fluid, tractor fluid, hydraulic fluid, power steering fluids, gear lubricant, or pump oil.

Y. An ethylene-based copolymer comprising:
from about 35 wt. % to about 60 wt. % units derived from ethylene; and
at least 1.0 wt. % or more of an α-olefin comonomer having 3 to 20 carbon atoms, based on the weight of the ethylene-based copolymer,
wherein the ethylene-based copolymer:
is substantially amorphous; and
has a polydispersity index of about 2.8 or less.

Z. The ethylene-based copolymer of embodiment Y, wherein the ethylene-based copolymer comprises from about 40 wt. % to about 50 wt. % unit derived from ethylene, based on the weight of the ethylene-based copolymer.

AA. The ethylene-based copolymer of embodiment Y or Z, wherein the ethylene-based copolymer has no substantial melting peak when measured by DSC.

BB. The ethylene-based copolymer of any of embodiments Y-AA, wherein the α-olefin comonomer is propylene, butene, hexene, or octene.

CC. The ethylene-based copolymer of any of embodiments Y-BB, wherein the ethylene-based copolymer is a ethylene/propylene copolymer.

DD. The ethylene-based copolymer of any of embodiments Y-CC, wherein the ethylene-based copolymer is a metallocene catalyzed copolymer.

EE. The ethylene-based copolymer of any of embodiments Y-DD, wherein the ethylene-based copolymer has an MFR (230° C., 2.16 kg) of from about 3 to about 10 kg/10 min.

FF. The ethylene-based copolymer of any of embodiments Y-EE, wherein the ethylene-based copolymer has an intramolecular composition distribution of about 15 wt. % or less.

GG. The ethylene-based copolymer of any of embodiments Y-FF, wherein the ethylene-based copolymer has an intermolecular composition distribution of about 15 wt. % or less.

HH. A masterbatch composition comprising the ethylene-based copolymer of any of embodiments Y-GG.

II. The masterbatch composition of embodiment HH, further comprising at least one additive.

JJ. Method for modifying the rheology of a first composition comprising the step of combining the ethylene-based copolymer of any of embodiments Y-GG with the first composition.

KK. A lubricating oil composition comprising:
(a) a lubricating oil base; and
(b) an ethylene-based copolymer comprising:
from about 35 wt. % to about 60 wt. % units derived from ethylene, based on the weight of the ethylene-based copolymer; and
at least 1.0 wt. % or more of an α-olefin comonomer having 3 to 20 carbon atoms,
wherein the ethylene-based copolymer:
is substantially amorphous; and
has a polydispersity index of about 2.8 or less.

LL. The lubricating oil composition of embodiment KK, wherein the lubricating oil composition has a TE of about 2.2 or less.

MM. The lubricating oil composition of embodiment KK or LL, wherein the lubricating oil composition has a TE of about 2.2 or less and the ethylene-based copolymer comprises from about 40 wt. % to about 50 wt. % derived from ethylene, based on the weight of the ethylene-based copolymer.

NN. The lubricating oil composition of any of embodiments KK-MM, wherein the lubricating oil composition exhibits no substantial crystallinity at about 0° C. or below.

OO. The lubricating oil composition of any of embodiments KK-NN, wherein the lubricating oil composition is characterized as having a slope less than one at less than 0° C. when viscosity at 0.1 rad/sec is plotted as a function of temperature.

PP. The lubricating oil composition of any of embodiments KK-OO, wherein the lubricating oil composition exhibits a SSI value of about 25 or less.

QQ. The lubricating oil composition of any of embodiments KK-PP, wherein the ethylene-based copolymer has no substantial melting peak when measured by DSC.

RR. The lubricating oil composition of any of embodiments KK-QQ, wherein the ethylene-based copolymer has an MFR (230° C., 2.16 kg) of from about 3 to about 10 kg/10 min.

SS. The lubricating oil composition of any of embodiments KK-RR, wherein the lubricating oil composition comprises from about 0.1 wt. % to about 5 wt. % of ethylene-based copolymer.

TT. The lubricating oil composition of any of embodiments KK-SS, further comprising at least one additive.

UU. The lubricating oil composition of any of embodiments KK-TT, further comprising from about 0.05 wt. % to about 5 wt. % of a pour point depressant, based on the weight of the lubricating oil composition.

VV. The lubricating oil composition of any of embodiments KK-UU, wherein the lubricating oil composition is a crankcase lubricating oil, automatic transmission fluid, tractor fluid, hydraulic fluid, power steering fluids, gear lubricant, or pump oil.

WW. A method of making ethylene-based copolymers comprising the step of contacting ethylene monomers with one or more monomers with a solvent in the presence of a catalyst in a reactor, under reactor conditions suitable to produce an ethylene-based copolymer, wherein the resulting copolymer comprises from about 40% to about 50 wt. % units derived from ethylene, and a. has an MFR (230° C., 2.16 kg) of from about 3 to about 10 kg/10 min;

b. has a molecular weight distribution between about 2 and about 2.2; and c. is substantially amorphous.

XX. The process of embodiment WW, wherein the copolymer is produced without the use of an additional shearing or degradation process.

YY. The process of embodiment WW or XX, further comprising the step of extruding the copolymer into an aqueous bath to form polymer pellets.

ZZ. The process of any of embodiment YY, wherein the pellets have a diameter of at least about 3.0 mm and a ratio of length to diameter (L/D) of from about 1.1 to about 1.4.

AAA. The process of any of embodiments WW to ZZ, wherein the polymer pellets are free-flowing until a final packaging step.

BBB. The process of any of embodiments WW to AAA, further comprising a packaging step.

CCC. The process of embodiment BBB, wherein the packaging step comprises baling polymer pellets.

DDD. The process of embodiment BBB or CCC, wherein the packaging step comprises bagging the polymer pellets.

EEE. An ethylene-based copolymer comprising:

from about 35 wt. % to about 80 wt. % units derived from ethylene, and at least 1.0 wt. % or more of an α-olefin comonomer having 3 to 20 carbon atoms, based on the weight of the ethylene-based copolymer, wherein the ethylene-based copolymer has:

a melting peak (Tm), as measured by DSC, of 80° C. or less; and a polydispersity index of about 2.8 or less;

and wherein at least 50 wt. %, at least 60 wt. %, at least 80 wt. %, at least 90 wt. %, or 100 wt. % of the ethylene-based copolymers have an intermolecular composition distribution of about 50 wt. % or less, or 40 wt. % or less, or 30 wt. % or less, or 20 wt. % or less, or 15 wt. % or less, or 10 wt. % or less, or 5 wt. % or less, and/or an intramolecular composition distribution of about 50 wt. % or less, or 40 wt. % or less, or 30 wt. % or less, or 20 wt. % or less, or 15 wt. % or less, or 10 wt. % or less, or 5 wt. % or less.

FFF. Any one of embodiments A-M, P-KK, and NN-EEE, wherein the copolymer has a polydispersity index of about 2.6 or less or 2.4 or less.

EXAMPLES

The following non-limiting embodiments identify exemplary ethylene-based copolymers, properties thereof, and uses thereof.

Preparation of Ethylene-Based Copolymers; Propylene Comonomers

A polymer composition was synthesized in one continuous stirred tank reactor. The polymerization was performed in solution, using hexane as a solvent. In the reactor, polymerization was performed at a temperature of 90° C., an overall pressure of 20 bar and ethylene and propylene feed rates of 1.3 kg/hr and 2 kg/hr, respectively. As the catalyst system, N,N-dimethylanilinium tetrakis(pentafluorophenyl)borate was used to activate di(p-triethylsilylphenyl)methenyl[(cyclopentadienyl)(2,7-di-tert-butylfluoren-9-yl)]hafnium dimethyl. In the process, hydrogen addition and temperature control were used to achieve the desired MFR. The catalyst, activated externally to the reactor, was added as needed in amounts effective to maintain the target polymerization temperature.

The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt. % of solvent and other volatiles. The molten polymer was cooled until solid.

Preparation of Lubricant Oil Composition

The ethylene propylene copolymer from Example 1 was dissolved in STS ENJ102 oil available form ExxonMobil at a 1.5 wt. % concentration, to resemble commercially used lubricant formulations.

Preparation of a Lubricant Oil Concentrate

A lubricant oil concentrate was prepared with 11.3 wt. % of the ethylene propylene copolymer of Example 1, 14.8 wt. % of a detergent inhibitor package, 0.3 wt. % of a pour point depressant, and the remainder is a SAE 10W40 base oil. The base oil was composed of 58 wt. % of Chevron 100 and 42 wt. % of Chevron 220 oils available from Chevron.

The following examples demonstrate that ethylene-based copolymers described herein are useful as components of lubricant oil compositions having properties similar to those of formulations made from components prepared by more complex and more expensive multi-step methods.

Group I Examples

Example 1

Ethylene Propylene Polymers at about 45% $C_2$ Composition

As shown in Table 2 and FIG. 1, ethylene-based copolymers were prepared according to the procedure outlined above and tested for TE in American Core 150N base oil and as a 1% solution in the same base oil for the SSI determination.

TABLE 2

| | MFR | MFRR | % $C_2$ | TE | SSI (30 pass KO) |
|---|---|---|---|---|---|
| Example 1.1 | 6.27 | 30.74 | 45.6 | 1.86 | 27.3 |
| Example 1.2 | 6.27 | 30.74 | 45.4 | 1.88 | 25.5 |
| Example 1.3 | 6.16 | 29.87 | 45.6 | 1.89 | 25.2 |
| Example 1.4 | 6.16 | 29.87 | 45.6 | 1.91 | 26.0 |
| Example 1.5 | 6.66 | 32.36 | 44.6 | 1.93 | 29.1 |
| Example 1.6 | 6.66 | 32.36 | 44.6 | 1.87 | 24.4 |
| Example 1.7 | 5.99 | 30.23 | 44.4 | 1.87 | 27.4 |
| Example 1.8 | 5.99 | 30.23 | 44.4 | 1.88 | 25.4 |
| Example 1.9 | 5.99 | 30.23 | 44.4 | 1.89 | 25.8 |
| Example 1.10 | 5.33 | 30.66 | 44.4 | 1.93 | 30.2 |
| Example 1.11 | 5.33 | 30.66 | 44.4 | 1.93 | 27.2 |
| Example 1.12 | 5.33 | 30.66 | 44.3 | 1.93 | 26.9 |
| Example 1.13 | 5.00 | 31.63 | 45.2 | 2.00 | 29.3 |

Example 2

Ethylene Propylene Polymers Near 45% $C_2$ Composition

Ethylene-based copolymers were made according to the procedure outlined above and tested for TE in American Core 150N base oil and as a 1% solution in the same base oil for the SSI determination.

TABLE 3

| Example | $C_2$ content | MFR | SSI (30 pass KO) | TE | Mw | Mn | MWD |
|---|---|---|---|---|---|---|---|
| 2.1 | 48.4 | 5.78 | 25.97 | 1.98 | 76177 | 35779 | 2.13 |
| 2.2 | 48.2 | 6.81 | 27.02 | 1.97 | 76093 | 35489 | 2.14 |
| 2.3 | 48.0 | 6.72 | 27.32 | 1.96 | 73644 | 35037 | 2.1 |
| 2.4 | 47.2 | | 26.07 | 1.91 | 71756 | 32086 | 2.23 |
| 2.5 | 47.2 | 7.8 | 25.56 | 1.90 | 71573 | 33309 | 2.15 |
| 2.6 | 48.2 | 6.7 | 27.53 | 1.90 | 75120 | 35801 | 2.1 |
| 2.7 | 51.2 | 3.32 | 32.44 | 2.12 | 85268 | 40269 | 2.12 |

Example 3

Range of Ethylene Propylene Polymers Composition

Ethylene-based copolymers were made according to the procedure outlined above and tested for TE in American Core 150N base oil and as a 1% solution in the same base oil for the SSI determination.

TABLE 4

| Example | $M_W$ (g/mol) | MFR @ 230° C. | EPR Polymer Wt. % $C_2$ | KV100 1% EPR in AC150 | TE | SSI (30 pass KO) |
|---|---|---|---|---|---|---|
| 3.1 | 97,000 | 3.6 | 74.4 | 12 | 2.46 | 26.28 |
| 3.2 | 80,000 | 8.4 | 71.8 | 11.12 | 2.14 | 18.99 |
| 3.3 | 89,000 | 5.6 | 71.8 | 11.57 | 2.30 | 23.04 |
| 3.4 | 99,000 | 3.8 | 71.9 | 11.75 | 2.42 | 27.25 |
| 3.5 | 103,000 | 2.5 | 70.9 | 12.69 | 2.52 | 29.81 |
| 3.6 | 110,000 | 2.3 | 68.2 | 13.13 | 2.55 | 31.80 |
| 3.7 | 95,000 | 4.9 | 64.1 | 11.22 | 2.32 | 25.77 |
| 3.8 | 109,000 | 3.3 | 60.6 | 12.27 | 2.39 | 30.09 |
| 3.9 | 98,000 | 6.6 | 54.0 | 11.28 | 2.240 | |
| 3.10 | 108,000 | 4.6 | 51.5 | 11.65 | 2.334 | |
| 3.11 | 85,100 | 3.39 | 78.32 | | | |
| 3.12 | 110,800 | 1.5 | 74.1 | 13.23 | 2.69 | 31.91 |
| 3.13 | 57,000 | 14.9 | 73.1 | 9.552 | 1.76 | 9.90 |
| 3.14 | 44,200 | 88.0 | 73.7 | 8.475 | 1.43 | 3.49 |
| 3.15 | 36,600 | 203.0 | 73.4 | 7.848 | 1.19 | 3.00 |
| 3.16 | 57,300 | 18.5 | 62.1 | 9.021 | 1.64 | 10.13 |
| 3.17 | 101,300 | 2.4 | 65.3 | 12.16 | 2.47 | 29.41 |
| 3.18 | 87,100 | 6.1 | 60.7 | 10.9 | 2.12 | 23.81 |
| 3.19 | 67,100 | 7.4 | 77.9 | 10.52 | 1.58 | 6.99 |
| 3.20 | 45,800 | 40.0 | 67.7 | 8.514 | 2.69 | 31.91 |
| 3.21 | 52,800 | 27.3 | 68.9 | 8.966 | 1.76 | 9.90 |
| 3.22 | 97,600 | 6.3 | 44 | 10.52 | 2.039 | |
| 3.33 | 98,700 | 8.7 | 41.3 | 9.988 | 1.889 | |
| 3.34 | 76,800 | 8.9 | 47.4 | 9.718 | 1.810 | |
| 3.35 | 109,000 | | | 11.51 | 2.299 | |
| 3.36 | 125,000 | | | 12.57 | 2.553 | |
| 3.37 | 89,600 | 3.1 | 70.2 | 11.51 | 23.89 | 2.28 |
| 3.38 | 71,100 | 7.7 | 69.7 | 10.38 | 16.79 | 2.00 |
| 3.39 | 77,200 | 9.1 | 59.8 | 10.15 | 19.14 | 1.95 |
| 3.40 | 69,800 | 10.1 | 61.1 | 9.85 | 15.81 | 1.86 |
| 3.41 | 62,800 | 12.9 | 62.1 | 9.488 | 12.35 | 1.75 |

TABLE 5

Comparative example of commercial viscosity modifier

| | $C_2$ wt. % | TE | SSI |
|---|---|---|---|
| PTN 8900 | 64.50 | 2.00 | 24 |

Group II Examples

Amorphous Ethylene-Based Copolymers

Lubricant oil compositions composed of amorphous ethylene-based copolymers were prepared and compared to compositions described in U.S. Pat. No. 6,589,920.

Preparation of an Ethylene-Based Copolymer; Propylene Comonomers

A polymer composition is synthesized in one continuous stirred tank reactor. The polymerization is performed in solution, using hexane as a solvent. In the reactor, polymerization is performed at a temperature of 90° C., an overall pressure of 20 bar and ethylene and propylene feed rates of 1.3 kg/hr and 2 kg/hr, respectively. As the catalyst system, N,N-dimethylanilinium tetrakis(pentafluorophenyl)borate is used to activate di(p-triethylsilylphenyl)methenyl[(cyclopentadienyl)(2,7-di-tert-butylfluoren-9-yl)]hafnium dimethyl. In the process, hydrogen addition and temperature control is used to achieve the desired MFR. The catalyst, activated externally to the reactor, is added as needed in amounts effective to maintain the target polymerization temperature.

The copolymer solution emerging from the reactor is stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer is cooled until solid.

Preparation of Lubricant Oil Composition

The ethylene propylene copolymer from above is dissolved in STS ENJ102 oil available from ExxonMobil at a 1.5 wt. % concentration, to resemble commercially used lubricant formulations. The solution TE and SSI are measured and compared to a similar solution of Paratone® 8900 which is a commercially available viscosity improver which is made by separate solution and devolatilization of different ethylene-propylene copolymer fractions followed by blending and vis-breaking in a twin screw extruder.

As shown in Table 6(b), at similar ethylene content the present lubricant oil compositions will not exhibit a DSC peak, while providing desirable TE and SSI properties.

TABLE 6(a)

|  | Ethylene (wt. %) | DSC, ° C. |
|---|---|---|
| '920 patent ex. 6 | 47.2 | −38.5 |
| '920 patent ex. 7 | 46.8 | −36.2 |
| '920 patent ex. 8 | 49.6 | −40.8 |

TABLE 6(b)

|  | MFR (g/10 min) | Ethylene (wt. %) | DSC, ° C. | Thickening Efficiency | Shear Stability Index |
|---|---|---|---|---|---|
| Ex. 1 | 7.8 | 47.0 | None detected | 1.81 | 25 |
| Ex. 2 | 6.72 | 48.0 | None detected | 1.85 | 25 |
| Ex. 3 | 5.87 | 48.2 | None detected | 1.89 | 25 |

Figure 3:
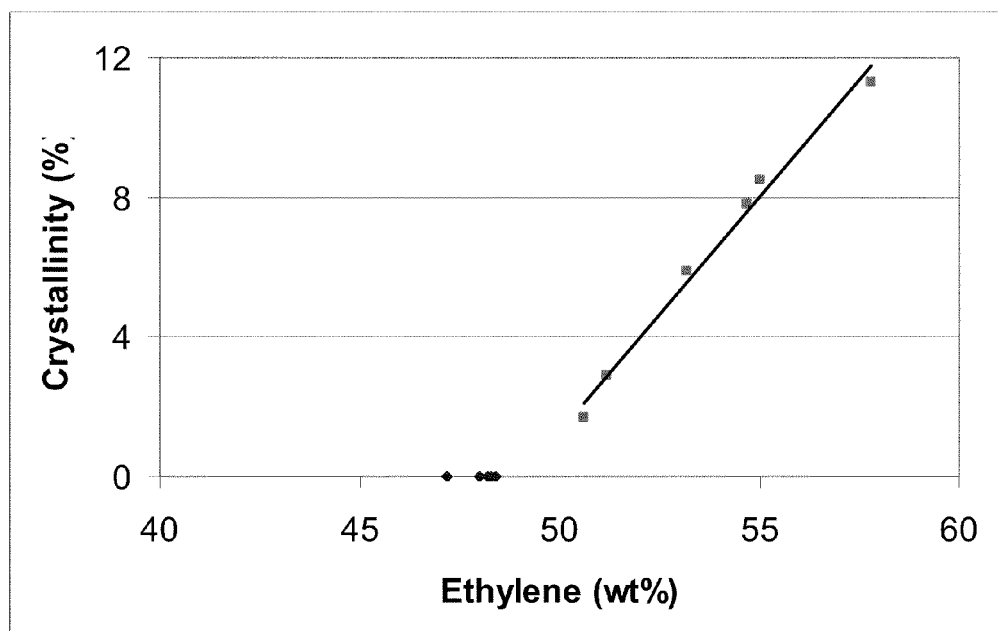
FIG. 3 is a graph of crystallinity weight percent versus ethylene weight percent for exemplary compositions and conventional compositions. This graph refers to experiments in "Group II Examples".

Additional samples were prepared according to the techniques described in "II. Examples". As shown in Table 7 and FIG. 3, these samples were then analyzed for physical properties and compared to conventional materials.

TABLE 7

| Polymer | $C_2$ | Crystallinity | MFR |  |
|---|---|---|---|---|
| 001 | 48.4 | 0 | 5.78 | — |
| 002 | 48.3 | 0 |  | — |
| 003 | 48.2 | 0 | 6.81 | — |
| 004 | 48 | 0 | 6.72 | — |
| 005 | 48 | 0 |  | — |
| 006 | 47.2 | 0 |  | — |
| 007 | 47.2 | 0 | 7.8 | — |
| 008 | 48.2 | 0 | 6.7 | — |
| 009 | 50.6 | 1.7 | 4.02 | comparative |
| 010 | 51.2 | 2.9 | 3.32 | comparative |
| 011 | 53.2 | 5.9 | 2.37 | comparative |
| 012 | 54.7 | 7.8 | 1.83 | comparative |
| 013 | 57.8 | 11.3 |  | comparative |
| ref sample | 55 | 8.5 |  | comparative |

Additional properties are shown in Tables 8-10:

TABLE 8

| Polymer | Mw | Mn | MWD |
|---|---|---|---|
| 001 | 76177 | 35779 | 2.13 |
| 003 | 76093 | 35489 | 2.14 |
| 004 | 73644 | 35037 | 2.1 |
| 006 | 71756 | 32086 | 2.23 |
| 007 | 71573 | 33309 | 2.15 |
| 008 | 75120 | 35801 | 2.1 |
| 010 (comparative) | 85268 | 40269 | 2.12 |

TABLE 9

| Example | DSC crystallinity | $C_2$ | MFR | MFRR |
|---|---|---|---|---|
| 1.1 | 0 | 46.6 | 5.1 | 32 |
| 1.2 | 0 | 45.7 | 5.7 | 30 |
| 1.3 | 0 | 44.8 | 7.1 | 29 |
| 1.4 | 0 | 44.8 | 7.5 | 29 |
| 1.5 | 0 | 44.8 | 7.0 | 29 |
| 1.6 | 0 | 44.9 | 7.1 | 29 |

TABLE 10

| Example | MFR | $C_2$ |
|---|---|---|
| 2.1 | 7.73 | 44.20 |
| 2.2 | 6.81 | 44.90 |
| 2.3 | 5.90 | 45.40 |
| 2.4 | 5.79 | 45.80 |
| 2.5 | 6.08 | 45.90 |
| 2.6 | 6.25 | 45.80 |
| 2.7 | 5.93 | 45.80 |
| 2.8 | 6.18 | 45.50 |
| 2.9 | 6.22 | 45.50 |
| 2.10 | 6.47 | 45.30 |
| 2.11 | 6.25 | 45.30 |
| 2.12 | 6.33 | 45.40 |
| 2.13 | 6.48 | 45.40 |
| 2.14 | 6.54 | 45.50 |
| 2.15 | 6.02 | 45.50 |
| 2.16 | 5.51 | 45.80 |
| 2.17 | 5.32 | 45.70 |
| 2.18 | 5.63 | 45.80 |
| 2.19 | 5.85 | 45.60 |
| 2.20 | 6.14 | 45.30 |
| 2.21 | 6.07 | 45.30 |
| 2.22 | 6.17 | 45.30 |
| 2.23 | 6.25 | 45.20 |
| 2.24 | 5.13 | 44.70 |
| 2.25 | 5.40 | 44.80 |
| 2.26 | 5.64 | 44.70 |
| 2.27 | 5.47 | 44.50 |
| 2.28 | 6.69 | 44.00 |
| 2.29 | 6.83 | 44.30 |
| 2.30 | 6.92 | 44.20 |
| 2.31 | 6.55 | 44.20 |
| 2.32 | 7.40 | 44.20 |
| 2.33 | 7.42 | 44.30 |

When numerical lower limits and numerical upper limits are listed herein, ranges from any lower limit to any upper limit are contemplated. All references, patents and documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A copolymer comprising:
   from about 35 wt. % to about 80 wt. % units derived from ethylene, and
   at least 1.0 wt. % of units derived from α-olefin comonomer having 3 to 20 carbon atoms, based on the weight of the copolymer,
   wherein the copolymer has:
      a melting peak (Tm), as measured by DSC, of 80° C. or less;
      a polydispersity index of about 2.8 or less; and
      has an intramolecular composition distribution of about 15 wt. % or less.

2. The copolymer of claim 1, wherein the copolymer has a polydispersity index of about 2.4 or less.

3. The copolymer of claim 1, wherein at least 80 wt. % of the copolymer has an intermolecular composition distribution of about 50 wt. % or less.

4. The copolymer of claim 1, wherein the copolymer has an intramolecular composition distribution of about 15 wt. % or less.

5. The copolymer of claim 1, wherein the copolymer is substantially linear.

6. The copolymer of claim 1, wherein the copolymer comprises from about 40 wt. % to about 60 wt. % units derived from ethylene, based on the weight of the copolymer.

7. The copolymer of claim 1, wherein the α-olefin comonomer is propylene, butene, hexene, or octene.

8. The copolymer of claim 1, wherein the copolymer has a weight-average molecular weight (Mw) of from about 80,000 to about 400,000.

9. A composition comprising the copolymer of claim 1 and at least one additive.

10. Method for modifying the rheology of a first composition comprising the step of combining the copolymer of claim 1 with the first composition.

11. A lubricating oil composition comprising a lubricating oil base and the copolymer of claim 1.

12. The lubricating oil composition of claim 11, wherein the lubricating oil composition has at least one of: (a) a thickening efficiency of about 2.2 or less; (b) a slope less than one at less than 0° C. when viscosity at 0.1 rad/sec is plotted as a function of temperature; and (c) a shear stability index value of about 25 or less.

13. The lubricating oil composition of claim 11, wherein the lubricating oil composition exhibits no substantial crystallinity at about 0° C. or below.

14. The lubricating oil composition of claim 11, wherein the lubricating oil composition comprises from about 0.1 wt. % to about 5 wt. % of copolymer.

15. The lubricating oil composition of claim 11, further comprising from about 0.05 wt. % to about 5 wt. % pour point depressant, based on the weight of the lubricating oil composition.

16. An ethylene-based copolymer comprising:
   from about 35 wt. % to about 80 wt. % units derived from ethylene, and
   at least 1.0 wt. % or more of an α-olefin comonomer having 3 to 20 carbon atoms, based on the weight of the ethylene-based copolymer,
   wherein the ethylene-based copolymer has:
      a melting peak (Tm), as measured by DSC, of 80° C. or less; and
      a polydispersity index of about 2.8 or less;
   and wherein at least 60 wt. % of the copolymer has an intermolecular composition distribution of about 50 wt. % or less and/or an intramolecular composition distribution of about 50 wt. % or less.

* * * * *

UNITED STATES PATENT AND TRADEMARK OFFICE
CERTIFICATE OF CORRECTION

| | | |
|---|---|---|
| PATENT NO. | : 8,309,501 B2 | Page 1 of 1 |
| APPLICATION NO. | : 12/761880 | |
| DATED | : November 13, 2012 | |
| INVENTOR(S) | : Rainer Kolb et al. | |

It is certified that error appears in the above-identified patent and that said Letters Patent is hereby corrected as shown below:

On the Title page of the patent, in item 60, Related U.S. Application Data, please delete "provisional application No. 61/299,816, filed on Jan. 29, 2010, provisional application No. 61/297,621, filed on Jan. 22, 2010" and insert --application No. 12/569,009, filed Sept. 29, 2009--.

In the Specification

In Column 1, Line 16, please delete "61/299,816" and insert --61/298,816--.

Signed and Sealed this
Twelfth Day of May, 2015

Michelle K. Lee
*Director of the United States Patent and Trademark Office*